(12) United States Patent
Komine et al.

(10) Patent No.: US 10,372,826 B2
(45) Date of Patent: *Aug. 6, 2019

(54) TRAINING DATA UPDATE

(71) Applicant: INTERNATIONAL BUSINESS MACHINES CORPORATION, Armonk, NY (US)

(72) Inventors: Hiroaki Komine, Yokohama (JP); Kaori Maruyama, Tsukaba (JP); Takumi Yanagawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,031

(22) Filed: Dec. 18, 2017

(65) Prior Publication Data
US 2019/0087411 A1    Mar. 21, 2019

Related U.S. Application Data

(63) Continuation of application No. 15/705,596, filed on Sep. 15, 2017.

(51) Int. Cl.
*G06N 5/04* (2006.01)
*G06F 17/27* (2006.01)
*G06N 20/00* (2019.01)

(52) U.S. Cl.
CPC ...... *G06F 17/2785* (2013.01); *G06F 17/2755* (2013.01); *G06N 5/048* (2013.01); *G06N 20/00* (2019.01)

(58) Field of Classification Search
CPC .......................... G06F 17/2785; G06F 17/2755
See application file for complete search history.

(56) References Cited

U.S. PATENT DOCUMENTS 6,289,513 B1 * 9/2001 Bentwich .................. G06F 8/30
706/45
8,234,179 B2    7/2012 Sundaresan et al.
(Continued)

FOREIGN PATENT DOCUMENTS

CN        1046166643 A    11/2014

OTHER PUBLICATIONS

IBM, List of IBM Patents or Patent Applications Treated as Related, Appendix P, dated Dec. 21, 2017, 2 pages.
(Continued)

*Primary Examiner* — Eric Yen
(74) *Attorney, Agent, or Firm* — Richard A. Wilhelm

(57) ABSTRACT

Training data including a first and second group of questions each associated with an answer is read into memory by a computer. A class of answers including the answer to a question for each question is determined, where each class of answers has a class label that is associated with each of the questions, and each of the questions are classified into a respective class of answers, accordingly. First and second training data is generated including the first and second groups of questions and corresponding classes of answers for use in first and second classifiers, respectively. Each question of the first and second group of questions is classified by the second and first classifiers, respectively, where the classifying generates corresponding classification results. The first or second training data is updated based on the classification results to generate corresponding updated first or second training data, respectively.

13 Claims, 17 Drawing Sheets

(56) References Cited

U.S. PATENT DOCUMENTS

| | | | |
|---|---|---|---|
| 9,286,910 B1 | 3/2016 | Li et al. | |
| 9,342,588 B2 | 5/2016 | Balchandran et al. | |
| 9,390,378 B2 | 7/2016 | Garrera et al. | |
| 2002/0169595 A1* | 11/2002 | Agichtein | G06F 17/2705 704/9 |
| 2003/0228034 A1* | 12/2003 | Fox | G06T 7/55 382/106 |
| 2007/0100812 A1* | 5/2007 | Simske | G06F 17/30011 |
| 2007/0288406 A1* | 12/2007 | Visel | G06N 3/10 706/14 |
| 2009/0233213 A1* | 9/2009 | Noge | G03G 9/0815 430/110.3 |
| 2009/0306967 A1* | 12/2009 | Nicolov | G06F 17/2785 704/9 |
| 2013/0085744 A1* | 4/2013 | Arias | G06F 17/289 704/3 |
| 2014/0067816 A1* | 3/2014 | Kanungo | G06F 17/274 707/740 |
| 2014/0163962 A1 | 6/2014 | Castelli et al. | |
| 2015/0026106 A1* | 1/2015 | Oh | G06F 17/3069 706/12 |
| 2016/0063395 A1* | 3/2016 | Cheng | G06N 7/005 706/12 |
| 2016/0125751 A1* | 5/2016 | Barker | G06F 17/3053 434/322 |
| 2016/0148096 A1 | 5/2016 | Bornea et al. | |
| 2017/0053211 A1* | 2/2017 | Heo | G06N 99/005 |

OTHER PUBLICATIONS

Pending U.S. Appl. No. 15/705,596, filed Sep. 15, 2017, entitled: "Training Data Update", 68 pages.

Malik et al., "Automatic Training Data Cleaning for Text Classification", 2011 IEEE 11th International Conference on Data Mining Workshops, Dec. 11, 2011, pp. 442-449, IEEE Conference Publications, Vancouver, BC, Canada.

Mell et al., "The NIST Definition of Cloud Computing", NIST, Sep. 2011, 7 Pages, Special Publication 800-145, U.S. Department of Commerce, Gaithersburg, MD.

International Search Report and the Written Opinion, International application No. PCT/IB2018/057011, filed Sep. 13, 2018, Date of completion of international search: Jan. 4, 2019, pp. 1-9.

\* cited by examiner

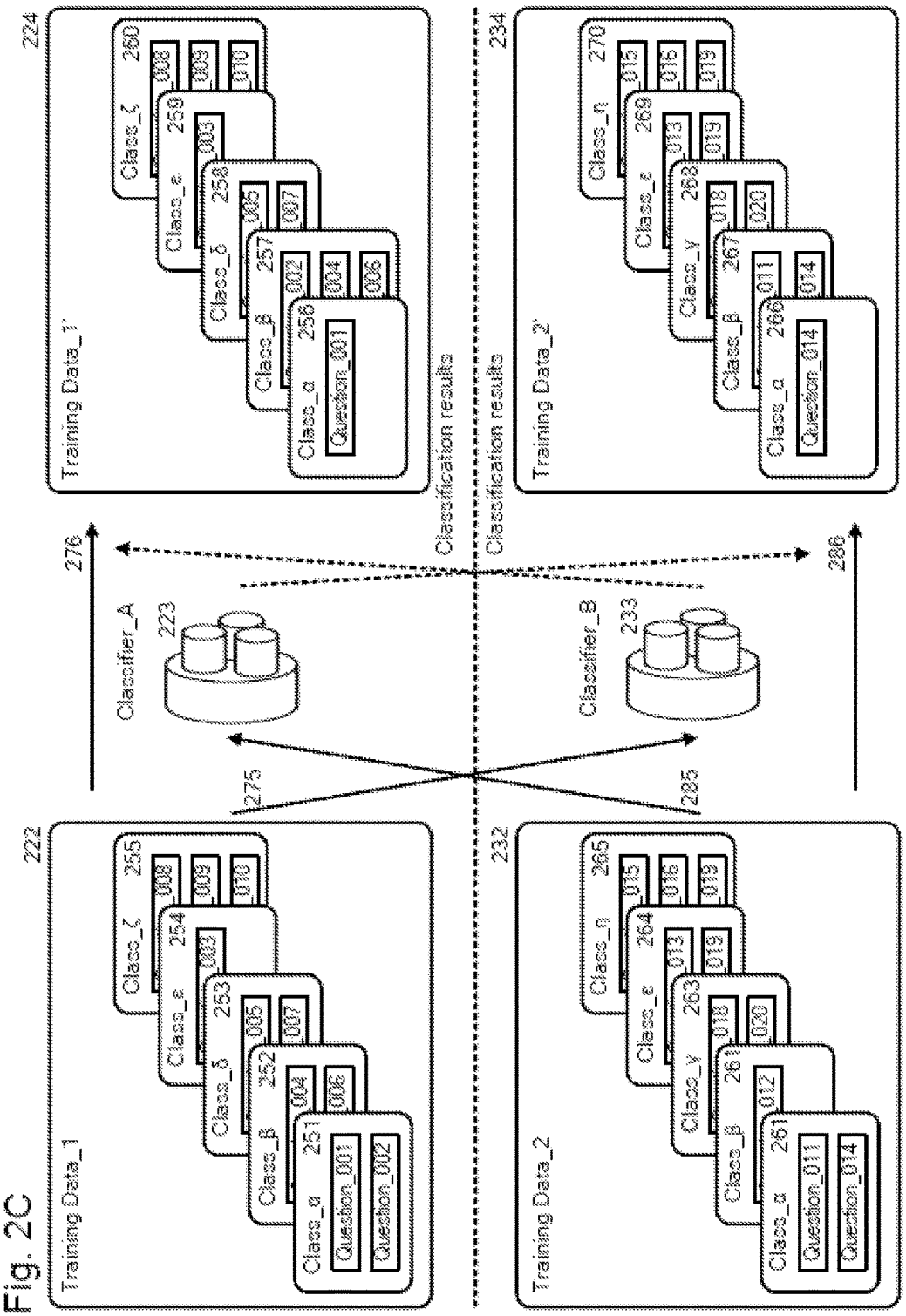

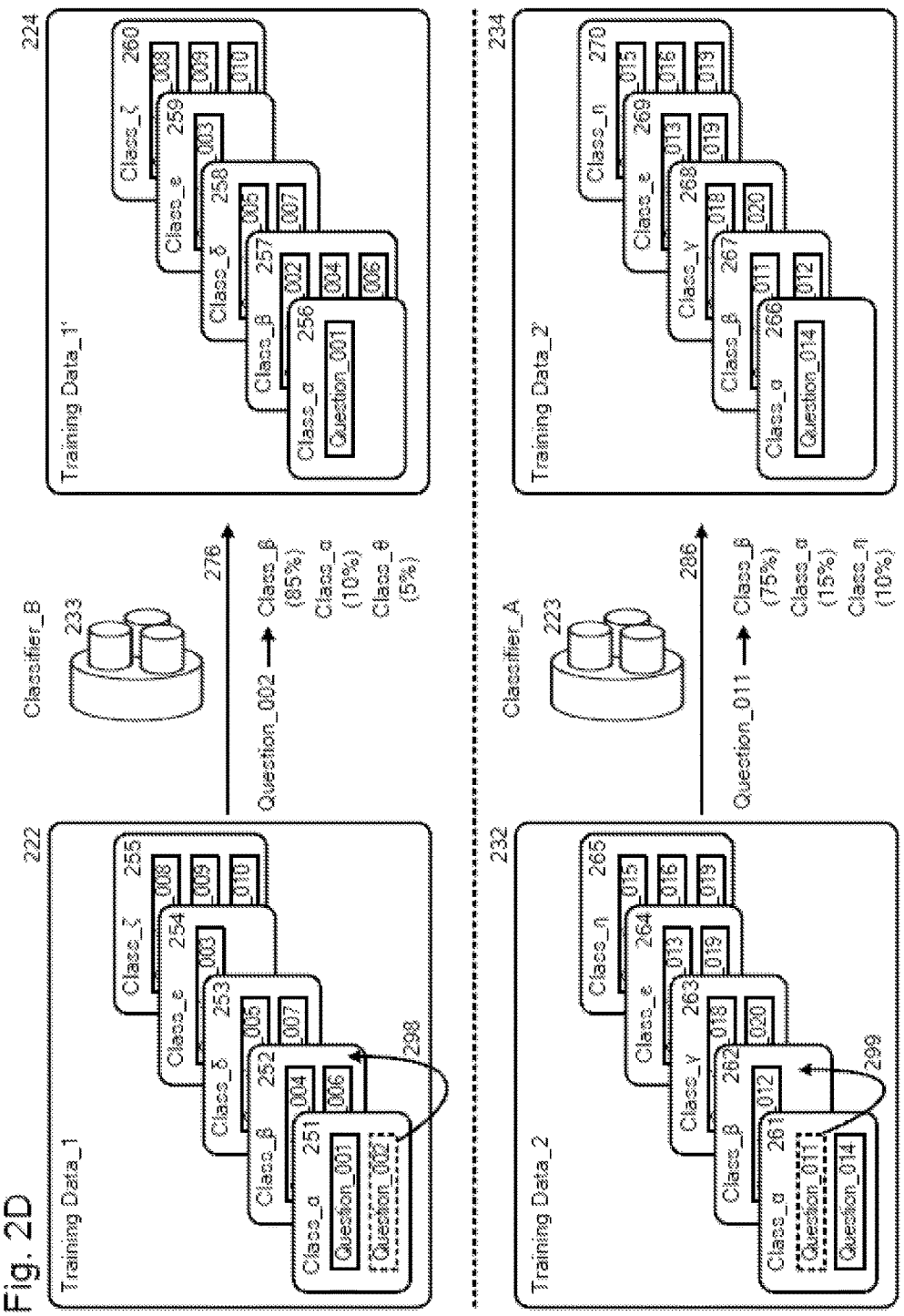

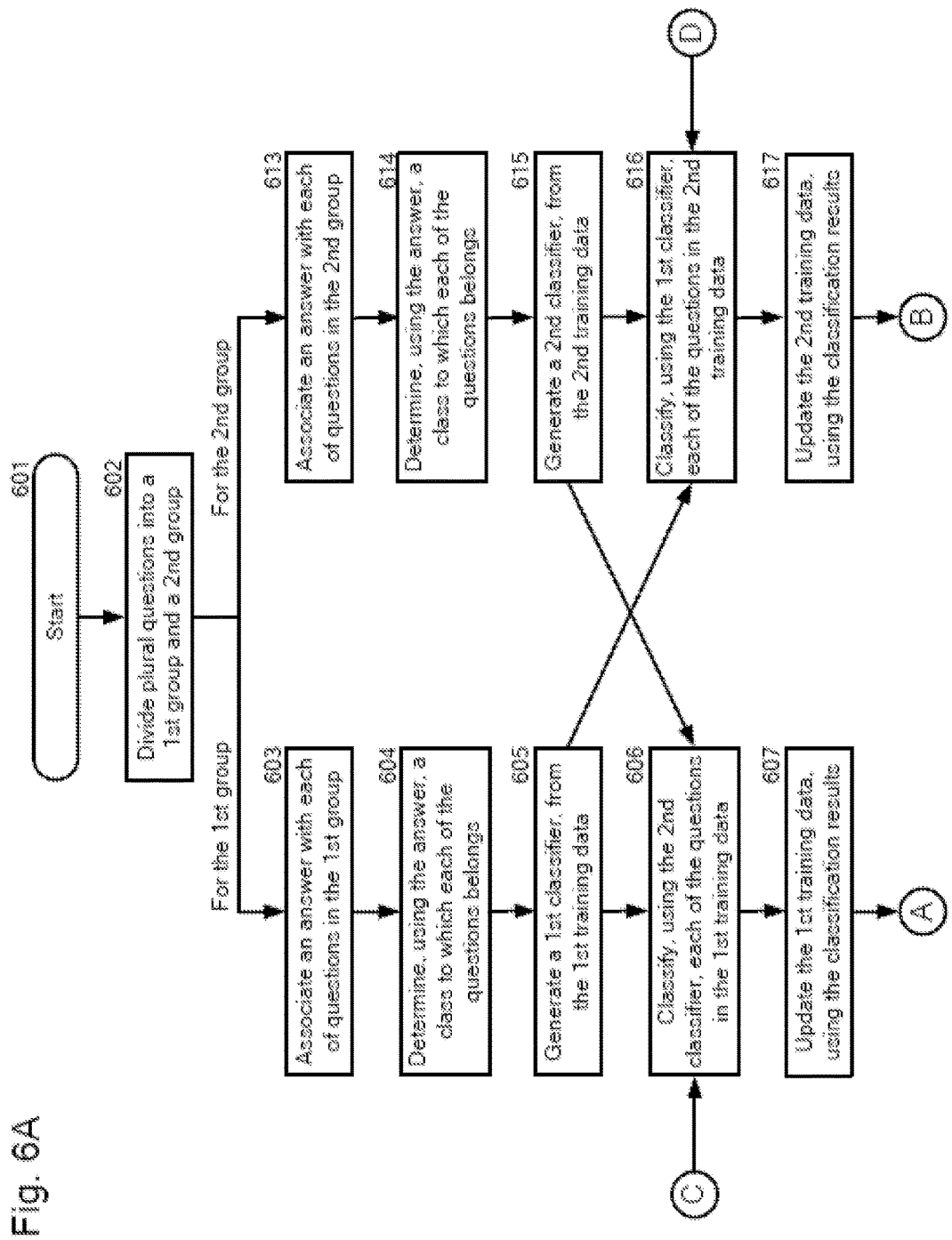

TRAINING DATA UPDATE

BACKGROUND

The present invention relates generally to natural language understanding, and more particularly to training data used in Natural Language Classifiers (NLCs).

NLCs find utility in various fields, by providing software applications the capability to semantically and contextually understand and interpret natural language, enabling performance of various tasks by the applications using the understanding and interpretation. NLCs use machine learning (ML) algorithms in processing received texts, including words or characters of a natural language, to determine and return matching classes or categories to which the received texts may most belong. NLCs learn from "example data" during training, to correctly return information in response to "new data" during use.

NLCs can be used in providing customer support. For example, an NLC can be used in predictively routing received questions from customers or users, to appropriate customer support persons or departments for answers. By incorporating Speech to Text functionality into software applications that use NLCs, voiced questions can also be predictively routed. Further, NLCs can be used in matching questions to answers or topics, in categorizing issues by severity, and so on. Various NLCs have been developed for use in a wide variety of software applications, services, and products, such as in Watson™ by IBM®, in Alexa® by Amazon®, and in Cortana® by Microsoft®.

The process of establishing an NLC for use typically includes: preparing training data, which may require identifying class labels, collecting representative texts, and matching classes to texts; training the NLC, which may require uploading the prepared training data to the NLC by way of an Application Programming Interface (API) for processing by ML algorithms of the NLC; querying or testing the trained NLC, which may require sending texts to the trained NLC by way of the API, and in return, receiving results including matching classes or categories to which the sent texts may most belong; evaluating the results; updating the initially prepared training data based on the evaluated results; and retraining the NLC using the updated training data, as necessary.

A method of effectively applying an understanding or interpretation of an expressed instance of natural language, such as in the form of texts, to perform a task includes making a determination as to semantics and intention of the expressed instance, and then classifying the expressed instance into one or more classes based on the determination. The performed task can include, for example, automatic text summarization, sentiment analysis, topic extraction, relationship extraction, and the like.

During use, an NLC can receive texts to determine to which of one or more classes the received texts most belong. The texts can be representative of a question or query, and the classes can be representative of groups or types of corresponding answers. In an example, a class can be formed of a group or type of answers corresponding to a group or type of questions. In the example, the NLC can determine to which of one or more groups of answers may most likely include a relevant answer with respect to a received question, based on characteristics of the received question. The NLC can operate according to a model developed and generated based on prepared training data uploaded to the NLC during training. The training data can be formed of a corpus, such as a text corpus or the like. The corpus can be formed of texts, feature vectors, sets of numbers, or the like. In the example, the texts of the corpus can include groups of related answers, as well as individual questions that each include one or more designations attempting to specify to which group of related answers each of the individual questions may most belong.

By appropriately training an NLC for use in a target business area it is possible to provide, for example, an automated system forming a virtual customer service agent configured to perform tasks in the target business area, such as by answering questions to provide customer support, or the like. The quality of the provided customer support, or the like, may depend on the quality and interpretation precision of the training data used in training of the NLC.

The process of preparing training data to establish an NLC for use in a target business area may include identifying suitable class labels and collecting sample texts, with respect to the target business area. In preparing the training data, a subject matter expert of the target business area may consider or conceive various sample texts to be classified with respect to various classes. The various sample texts and classes may include, for example, those relating to expected end-users, a target audience, or the like.

U.S. Pat. Nos.: 9,342,588, 9,390,378, and 8,234,179, each describe various methods of developing and refining training data used in training NLCs, and are incorporated herein by reference. Non-patent literature "Automatic Training Data Cleaning for Text Classification," by Hassan H. Malik et al. (ICDMW '11 Proceedings of the 2011 IEEE 11th International Conference on Data Mining Workshops, Pgs. 442-449, Dec. 11, 2011), describes another training data development and refinement method, and is also incorporated herein by reference. [ADD TO IDS]

SUMMARY

Aspects of the present invention are directed to a method, system, and computer program product for updating training data.

According to an aspect of the present invention, a computer-implemented method for updating training data is provided. The method may include reading the training data into memory, the training data comprising a first and second group of questions, wherein each question is associated with an answer. A determination is made as to a class of answers comprising the answer to a question for each question of the first and second groups of questions, the class of answers having a class label being associated with each of the questions, and each of the questions being classified into a respective class of answers. First and second training data are generated, comprising the first and second groups of questions and corresponding classes of answers for use in first and second classifiers, respectively. Each question of the first and second group of questions is classified by the second and first classifiers, respectively, where the classifying generates corresponding classification results. The first or second training data is updated based on the classification results to generate corresponding updated first or second training data, respectively.

According to an aspect of the present invention, a computer-implemented method for updating training data is provided. The method may include dividing a group of questions into a first and second group of questions and associating each question with an answer. Training data may subsequently be read the into memory, the training data comprising a first and second group of questions, wherein each question is associated with an answer. A determination is made as to a class of answers comprising the answer to a question for each question of the first and second groups of questions, the class of answers having a class label being associated with each of the questions, and each of the questions being classified into a respective class of answers. First and second training data are generated, comprising the first and second groups of questions and corresponding classes of answers for use in first and second classifiers, respectively. Each question of the first and second group of questions is classified by the second and first classifiers, respectively, where the classifying generates corresponding classification results. The first or second training data is updated based on the classification results to generate corresponding updated first or second training data, respectively.

According to a further aspect of the present invention, the method may include updating one of the first and second classifiers based on the updated first and second training data, respectively.

According to a further aspect of the present invention, the method may include iteratively classifying each question into a corresponding class of answers, iteratively updating the first and second training data, and iteratively updating one of the first and second classifiers until a degree of matching, determined for a class of answers comprising an answer to a question both before and after the classifying, exceeds a predetermined threshold value.

According to a further aspect of the present invention, the method may include iteratively classifying each question into a corresponding class of answers, iteratively updating the first and second training data, and iteratively updating one of the first and second classifiers until a difference between consecutive degrees of matching, determined for a class of answers comprising an answer to a question both before and after the classifying, does not exceed a predetermined threshold value.

According to a further aspect of the present invention, the method may include iteratively classifying each question into a corresponding class of answers, iteratively updating the first and second training data, and iteratively updating one of the first and second classifiers until a moving average value of degrees of matching, determined for a class of answers comprising an answer to a question both before and after the classifying, exceeds a predetermined threshold value.

According to a further aspect of the present invention, the method may include classification results comprising degree of confidence values corresponding to the classifying of each question with respect to corresponding classes of answers by the first and second classifiers, respectively. The first or second training data is then updated where one or more of the degree of confidence values exceeds a predetermined threshold value.

According to a further aspect of the present invention, the method may include using one or more of a search engine and an answer corpus in associating each question with an answer.

According to an aspect of the present invention, a computer system is provided. The computer system may include one or more computer processors, one or more computer-readable storage media, and program instructions stored on one or more of the computer-readable storage media for execution by at least one of the one or more computer processors. The program instructions may be executed to perform the disclosed method.

According to an aspect of the present invention, a computer program product is provided. The computer program product may include one or more computer-readable storage devices and program instructions stored on at least one of the one or more computer-readable storage devices for execution by at least one or more computer processors of a computer system. The program instructions may be executed by the at least one or more computer processors of the computer system to perform the disclosed method.

BRIEF DESCRIPTION OF THE DRAWINGS

The disclosure will provide details in the following description of preferred embodiments with reference to the following figures. The figures are not necessarily to scale. The figures are merely schematic representations, not intended to portray specific parameters of the invention. The figures are intended to depict only typical embodiments of the invention. In the figures, like numbering represents like elements.

FIGS. 2A, 2B, 2C, and 2D are each functional block diagrams depicting operational steps for providing a training data update, in accordance with an embodiment of the present invention.

FIG. 6A and FIG. 6B are flowcharts depicting a process of for updating training data, in accordance with an embodiment of the present invention.

DETAILED DESCRIPTION

Figure 1:
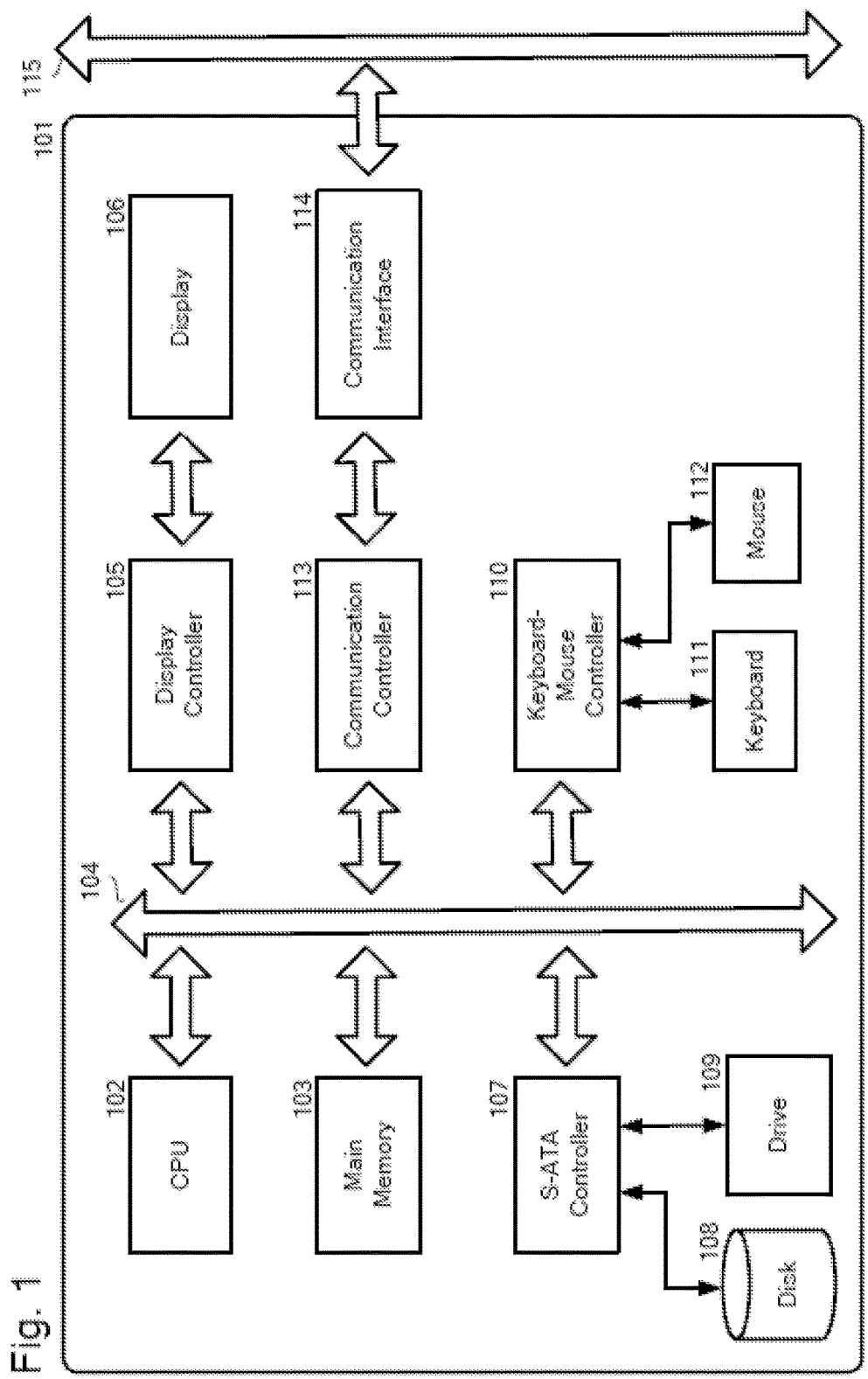
FIG. 1 is a block diagram depicting a computer system, in accordance with an embodiment of the present invention.

The descriptions of embodiments of the present invention have been presented and disclosed for purposes of illustration, and are not intended to be exhaustive, or limited to the embodiments disclosed. Many modifications and variations will be apparent to those of ordinary skill in the art without departing from the scope and spirit of the described embodiments. The terminology used herein was chosen to best explain the principles of the embodiments, the practical applications, or the technical improvements over conventional technologies, or to enable others of ordinary skill in the art to understand and practice the embodiments disclosed herein.

As will be appreciated by those of skill in the art, an embodiment of the present invention may be embodied as a method, system, or computer program product. Accordingly, an embodiment of the present invention may take the form of an entirely hardware-based embodiment, an entirely software-based embodiment, including, for example, firmware, resident software ad micro-code, and the like, or may take the form of an embodiment combining software-based and hardware-based aspects, which may be collectively referred to herein as a "circuit," a "module," or a "system."

As used herein, the expression "a/one" should be understood as "at least one." The expression "comprise(s)/comprising a/one" should be understood as "comprise(s)/comprising at least one." The expression "comprise(s)/comprising" should be understood as "comprise(s)/comprising at least." The expression "/" should be understood as "and/or."

To define more clearly terms as used herein, exemplified definitions of the terms are provided hereinafter, which should be interpreted broadly as known to those of skill in the art or technical field to which the present invention pertains.

As used herein, the term "training data" or "training dataset" refers to a set of data and information input to a classifier, such as a natural language classifier. The training data may comprise documents or texts, representative of questions, statements, utterances, expressions, sentiments, exclamations, commands, concepts, ideas, or the like, that have been mapped or labeled to specify to which class the documents or texts may correlate, correspond, or otherwise belong. The training data may take the form of, for example, electronic files or records.

As used herein, the term "labeling" refers to a process of associating documents or texts to classes of training data.

As used herein, the term "class" refers to a discrete category with which one or more documents or texts are associated. The discrete category may otherwise be or define as a class, group, or type of answers, a topic, a taxonomy, a domain, or the like.

As used herein, the term "training" refers to the process by which a classifier develops and generates an operating model based on training data uploaded to the classifier.

As used herein, the term "classifier" refers to a software component that accepts unlabeled documents as inputs, and returns discrete classes as outputs. A classifier may be a natural language classifier. The classifier is trained using training data including the labeled documents or texts, prior to use with respect to unlabeled documents or texts. After training, the classifiers can be used to classify unlabeled documents or texts in accordance with the training data.

Operation of the classification necessitates understanding of the texts or sentences and requires a large amount of labor-related resources. Further, quality of the classification by a subject matter expert in a target business area depends on a level of experience, an amount of domain knowledge, and the time available to the subject matter expert in labeling each of documents. In addition, fluctuations in classification may occur due to differences in the operations by the subject matter expert in the target business area, for example, due to a time of day when the classifications by the subject matter expert are performed. Thus, the classification performance using the classifier is largely affected by the accuracy and precision of the classification operation.

FIG. 1 is a block diagram depicting a computer system, in accordance with an embodiment of the present invention.

System (101) may be, for example, a desktop computer, a laptop computer, a notebook computer, a tablet computer, a netbook computer, a server computer, a general- or special-purpose computer, or the like. The server computer may take the form of, for example, a rack-mount type server, a blade type server, or a mainframe server and may implement, for example, a hypervisor for creating and running one or more virtual machines. System (101) may comprise one or more CPUs (102) and main memories (103), interconnected by way of bus (104). One or more of the CPUs (102) may be based, for example, on a 32- or 64-bit architecture. One or more of the CPUs (102) may be of, for example, the Power® series of IBM®; the Core i™ series, the Core 2™ series, the Atom™ series, the Xeon™ series, the Pentium® series, or the Celeron® series of Intel Corporation; the Phenom™ series, the Athlon™ series, the Turion™ series, or the Sempron™ series of Advanced Micro Devices, Inc.

System (101) may include an operating system, such as one providing a Windows®, UNIX®, Mac OS®, Linux®, or Java® processing environment. Various software applications, such as Java® applications, Java® virtual machines (VMs), Java® just-in-time (JIT) compilers such as J2EE®, other types programs, and any type of data may be stored in disk (108) for loading and use by way of the main memory.

Display (106) may be, for example, a liquid crystal display (LCD). Display (106) may be, for example, interconnected to bus (104) by way of display controller (105). The display (106) may be used to display, for example, information received by system (101) from one or more other computers over a network, by way of, for example, communication line (115). A memory disk such as disk (108) may take the form of, for example, a hard disk or SSD. Drive (109) may take the form of, for example, a CD drive, a DVD drive, or a Blu-ray Disk (BD) drive, and may be interconnected to bus (104) by way of an SATA or IDE controller (107). Various input devices, such as keyboard (111) or mouse (112), may be, for example, interconnected to bus (104) by way of keyboard-mouse controller (110) or a USB bus (not shown).

Drive (109) may be used to install a program, such as a computer program in accordance with embodiments of the present invention, onto system (101). The program may be, for example, readable and/or loadable from a CD-ROM, a DVD-ROM, or a BD, to disk (108) or directly to main memory (103).

Communication interface (114) may implement, for example, an Ethernet® protocol. Communication interface (114) may be, for example, interconnected to bus (104) by way of communication controller (113), to physically connect system (101) to communication line (115). Communication interface (114) may provide a network interface layer including TCP/IP communication protocols, for enabling communications functionality in system (101). Communication line (115) may be, for example, a wired LAN environment or a wireless LAN environment based on wireless LAN connectivity standards such as IEEE® 802.11a/b/g/n.

In an embodiment of the present invention, a classifier is used to generate training data. The classifier may normally be used in convention, for example, after training of the classifier using the training data.

FIGS. 2A, 2B, 2C, and 2D are each functional block diagrams depicting operational steps for providing a training data update, in accordance with an embodiment of the present invention.

Figure 2A:
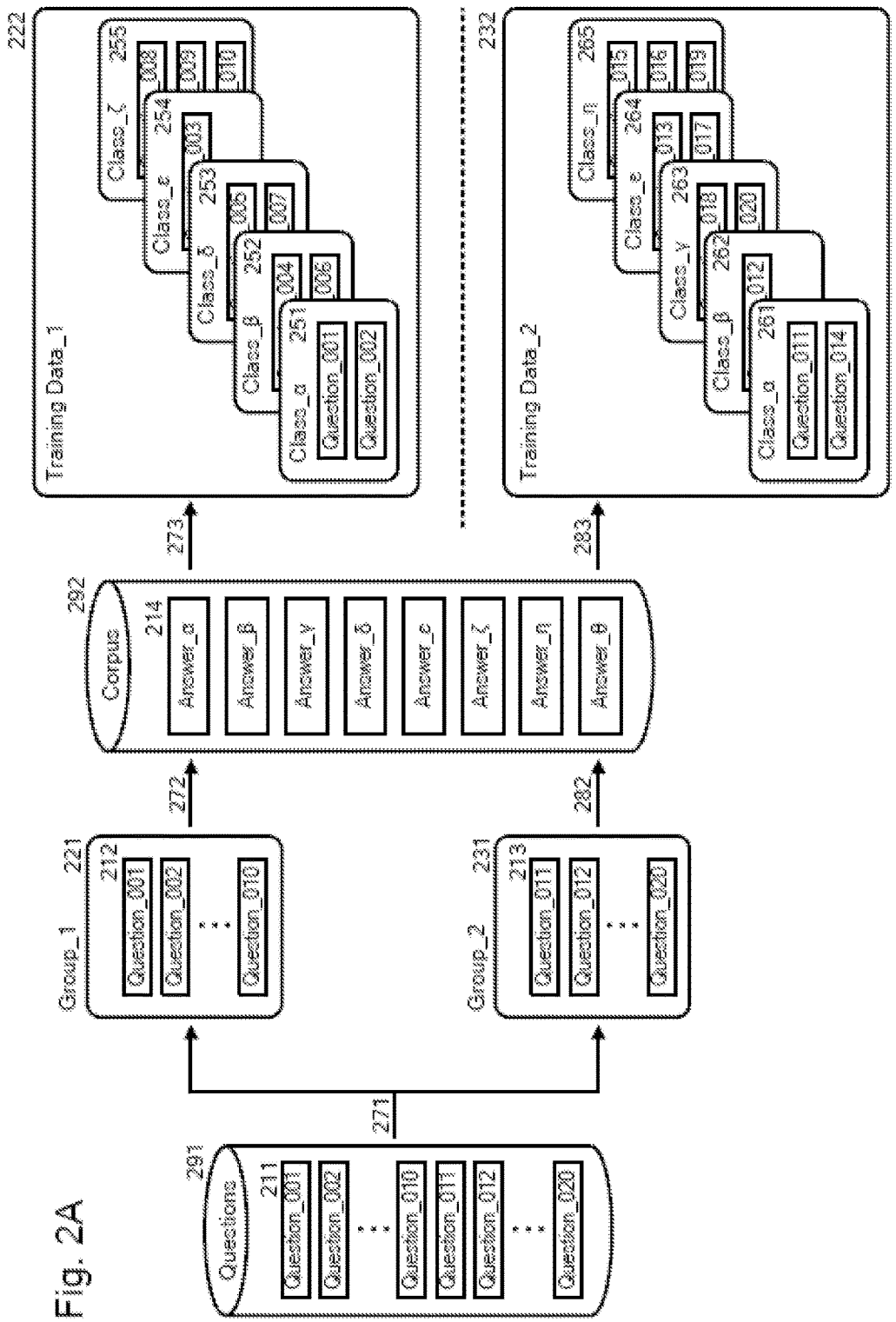

With reference to FIG. 2A, a first-generation training dataset set may include first and second training data. In an embodiment of the present invention, the first-generation training dataset may include or otherwise be formed by, for example, documents or texts forming a set of questions together with corresponding groups of candidate answers. In the embodiment, the set of questions may include, for example, texts forming search queries or questions, such as may be input to a search engine. In the embodiment, a question may include and be associated with a class label that may be defined with respect to a class or group of related candidate answers. The class label may specify the class or group of related candidate answers to which the question belongs. A group of related candidate answers may include answers relating to a common topic, domain, or the like. In the embodiment, identified characteristics of a question of the set of questions may be used as a basis for associating the question to a corresponding group of related candidate answers. In the embodiment, the first-generation training dataset may be, for example, initially prepared and input to system (101) for processing by a classifier. In the embodiment, the first-generation training dataset may be prepared, for example, by a subject matter expert of a target business area. In various embodiments, the first-generation training dataset may otherwise include or be formed by, for example, documents or texts forming related sets of statements utterances, expressions, sentiments, exclamations, commands, concepts, or the like.

In an example, the first-generation training dataset includes groups of candidate answers, each defined by a respective class label. In the example, the first-generation training dataset includes a set of questions including 5 to 10 questions, each labeled with respect to group of the groups of related candidate answers. Where training data is used to train a classifier including a set of questions having a small or low number of questions, overtraining or overfitting can occur as a result with respect to the classifier, causing the classifier to produce various output errors during use, such as in the form of interpretation errors or matching errors. Where the training data includes a set of questions having a large or high number of questions, demand for computational resources during training may be high.

With reference to FIG. 2A, a set of questions may include twenty questions: Question_001 to Question_020 (211). The set of questions may be stored, for example, in storage (291) and implemented by way of main memory (103) or disk (108). In an embodiment of the present invention, each group of candidate answers may be, for example, based on or otherwise drawn from a corresponding corpus, such as corpus (292). In the embodiment, corpus (292) may be, for example, an answer corpus including a collection of candidate answers. One or more candidate answers may correspond to a question of the set of questions. Corpus (292) may be, for example, a FAQ or manual. As depicted in FIG. 2A, eight classes of candidate answers (214) may each be defined by a class label, respectively denoted by Answer_α, Answer_β, Answer_γ, Answer_δ, Answer_ε, Answer_ζ, Answer_η, and Answer_θ. Corpus (292) may be stored, for example, in storage (292) and implemented by way of main memory (103) or disk (108). The set of questions and the groups of candidate answers may be collected by way of system (101).

At step 271, system (101) may divide the set of questions into two or more mutually exclusive groups of questions. The set of questions may be divided, for example, based on an identifier or unique index associated with each of the questions. The set of questions may otherwise be divided, for example, based on identified characteristics of each of the questions. A manner of division of the set of questions may be chosen as a matter of design choice. As depicted in FIG. 2A, the two groups may include Group_1 (221) and Group_2 (231). Group_1 (221) may include each of Question_001 to Question_010 (212). Group_2 (231) may include each of Question_011 to Question_020 (213).

At step 272, system (101) may identify, by way of corpus (292), a candidate answer corresponding to each question in Group_1 (221). The candidate answers may be identified, for example, by implementing a search engine (not shown).

At step 273, system (101) may output one or more identified candidate answers corresponding to each question in Group_1 (221). The output may include degrees of confidence for each identified candidate answer, determined as a function of respective relationships between identified candidate answers and corresponding questions. The identified candidate answers may be associated with questions in Group_1 (221) based on relative degrees of confidence of the identified candidate answers. System (101) may determine to which class or group of related candidate answers a question in Group_1 (221) belongs, in order to classify the question, based on, for example, the identified candidate answers having degrees of confidence that exceed a predetermined threshold. An identifier associated with the answer to which the question belongs may be attached as a class label to the question, accordingly.

As depicted in FIG. 2A, Question_001 may be classified into Class_α (251) and be associated with a corresponding class label, such as answer_α. Question_002 to Question_010 may be similarly classified and associated with a corresponding class label. A number of relations or associations n, between an answer and one or more corresponding questions, may be defined in terms of a positive integer. In an example, an answer having an association with 1 question can be defined by n=1. In the example, another answer having an association with 2 questions can be defined by n=2. Accordingly, system (101) may generate a first training data, such as Training Data_1 (222), as depicted in FIG. 2A.

In an example, Training Data_1 (222) includes Question_001 to Question_010, as depicted in FIG. 2A. Question_001 and Question_002 are classified into Class_α (251), and commonly associated with class label answer_α. Question_003 is classified into Class_ε (254), and is associated with class label answer_ε. Question_004 and Question_006 are classified into Class_β (252), and commonly associated with class label answer_β. Question_005 and Question_007 are classified into Class_δ (253), and commonly associated with class label answer_δ. Question_008, Question_009, and Question_010 are classified into Class_ζ (255), and commonly associated with class label answer_ζ. In the example, none of Question_001 to Question_010 are classified into class_γ, class_η, or class_θ, as depicted in FIG. 2A. Accordingly, Training Data_1 (222) may not include such classes.

In a manner similar to that of step 272, at step 282, system (101) may identify, by way of corpus (292), a candidate answer corresponding to each question in Group_2 (231).

In a manner similar to that of step 273, at step 283, system (101) may output one or more identified candidate answers corresponding to each question in Group_2 (231). The output may similarly include degrees of confidence for each identified candidate answer. The identified candidate answers may be associated with questions in Group_2 (231) based on relative degrees of confidence of the identified candidate answers. System (101) may similarly determine to which class or group of related candidate answers a question in Group_2 (231) belongs, in order to classify the question. An identifier associated with the answer to which the question belongs may similarly be attached as a class label to the question, accordingly. As such, system (101) may generate a second training data, such as Training Data_2 (232), as depicted in FIG. 2A.

In the example, Training Data_2 (232) includes Question_011 to Question_020, as depicted in FIG. 2A. Question_011 and Question_014 are classified into Class_$\alpha$ (251), and commonly associated with class label answer_$\alpha$. Question_012 is classified into Class_$\beta$ (262), and is associated with class label answer_$\beta$. Question_013 and Question_017 are classified into Class_$\varepsilon$ (264), and commonly associated with class label answer_$\varepsilon$. Question_015, Question_016, and Question_019 are classified into Class_$\eta$ (265), and commonly associated with class label answer_$\eta$. Question_018 and Question_020 are classified into Class_$\gamma$ (263), and commonly associated with class label answer_$\gamma$. In the example, none of Question_011 to Question_020 are classified into class_$\delta$, class_$\zeta$, or class_$\theta$, as depicted in FIG. 2A. Accordingly, Training Data_2 (232) may not include such classes.

In an embodiment of the present invention, Training Data_1 (222) and Training Data_2 (232) may be, for example, used in training two distinct classifiers. In the embodiment, steps 272 and 273 may be performed simultaneously, or not, with respect to steps 282 and 283.

Figure 2B:
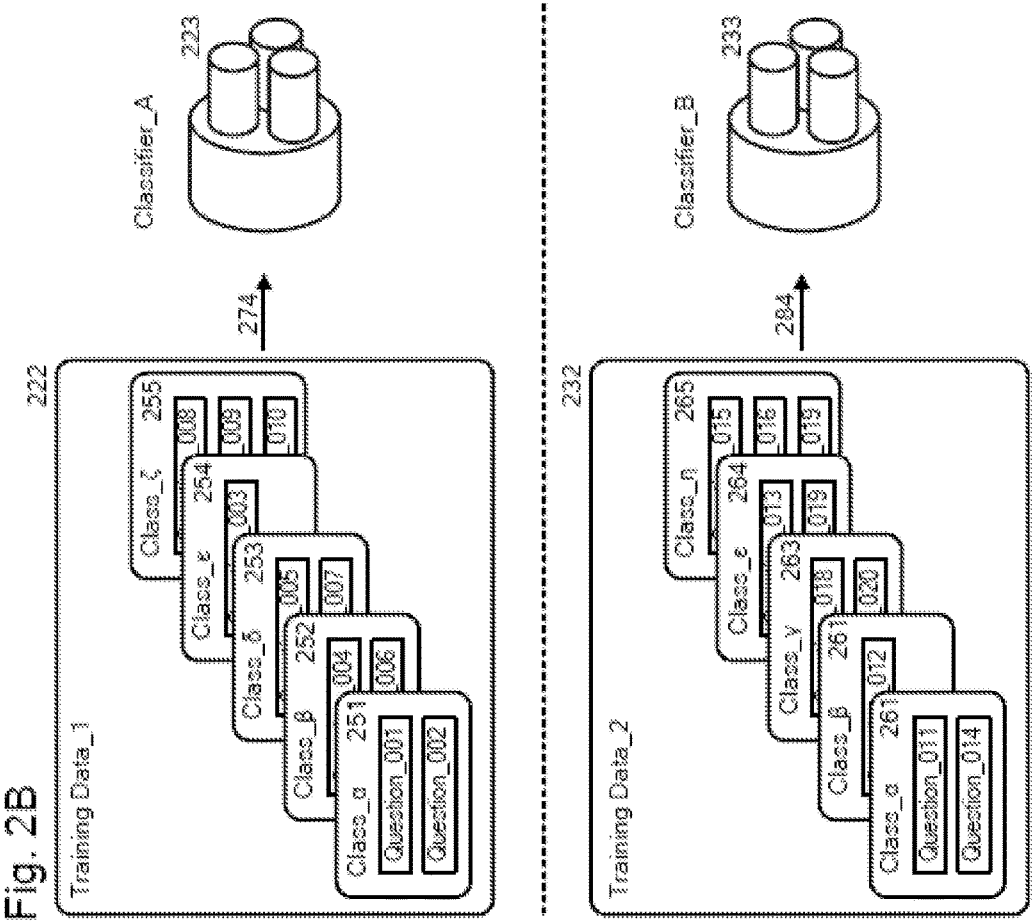

With reference to FIG. 2B, a first classifier and a second classifier may be generated based on the first and second training data.

At step 274, system (101) may train and generate the first classifier, for example, Classifier_A (223), based on Training Data_1 (222). Similarly, at step 284, system (101) may train and generate the second classifier, for example, Classifier_B (233) based on Training Data_2 (232). In an embodiment of the present invention, step 274 may be performed simultaneously, or not, with respect to step 284.

With reference to FIG. 2C and FIG. 2D, each of the first and second training data may be updated.

At step 275, system (101) may classify each of Question_001 to Question_010 (212) in Training Data_1 (222) by way of Classifier_B (233). For example, where the predetermined threshold is set to 50%, and Question_002 is classified with respect to Class_$\beta$ with a 85% degree of confidence, Class_$\alpha$ with a 10% degree of confidence, and Class_$\theta$ with a 5% degree of confidence, system (101) may classify Question_002 into Class_$\beta$. Note that this is in contrast to the classification of Question_002 into Class_$\alpha$ by way of Classifier_A (223). In an embodiment of the present invention, where a question is classified with respect to each of one or more classes with a degree of confidence lower than the predetermined threshold, the question is associated with the class with the highest relative degree of confidence, but is not classified into the class.

At step 276, system (101) may update Training Data_1 (222) using the classification results produced by way of Classifier_B (233). For example, the update may include reclassifying (298) Question_002 into Class_$\beta$ (252) from Class_$\alpha$ (251). The update may otherwise include changing an initial class of Question_002, accordingly. The update may otherwise include any other type of modifying operation, which may be chosen as a matter of design choice. In an embodiment of the present invention, an update to the first training data may be generated, such as in the form of Training Data_1 (224). Training Data_(224) may be an updated version of Training Data_1 (222).

In a manner similar to that of step 275, at step 285, system (101) may classify each of Question_011 to Question_020 (213) in Training Data_2 (232) by way of Classifier_A (223). For example, where the predetermined threshold is set to 50%, and Question_011 is classified with respect to Class_$\beta$ with a 75% degree of confidence, Class_$\alpha$ with a 15% degree of confidence, and Class_$\eta$ with a 10% degree of confidence, system (101) may classify Question_011 into Class_$\beta$. Note that this is in contrast to the classification of Question_011 into Class_$\alpha$ by way of Classifier_B (233). Where a question is classified with respect to each of one or more classes with a degree of confidence lower than the predetermined threshold, the question is associated with the class with the highest relative degree of confidence, but is not classified into the class.

In a manner similar to that of step 276, at step 286, system (101) may update Training Data_2 (232) using the classification results produced by way of Classifier_A (223). For example, the update may include, for example, reclassifying (299) Question_011 into Class_$\beta$ (262) from Class_$\alpha$ (261). System (101) may then generate Training Data_2' (234). Training Data_2' (234) may be an updated version of Training Data_2 (232).

Figure 3:
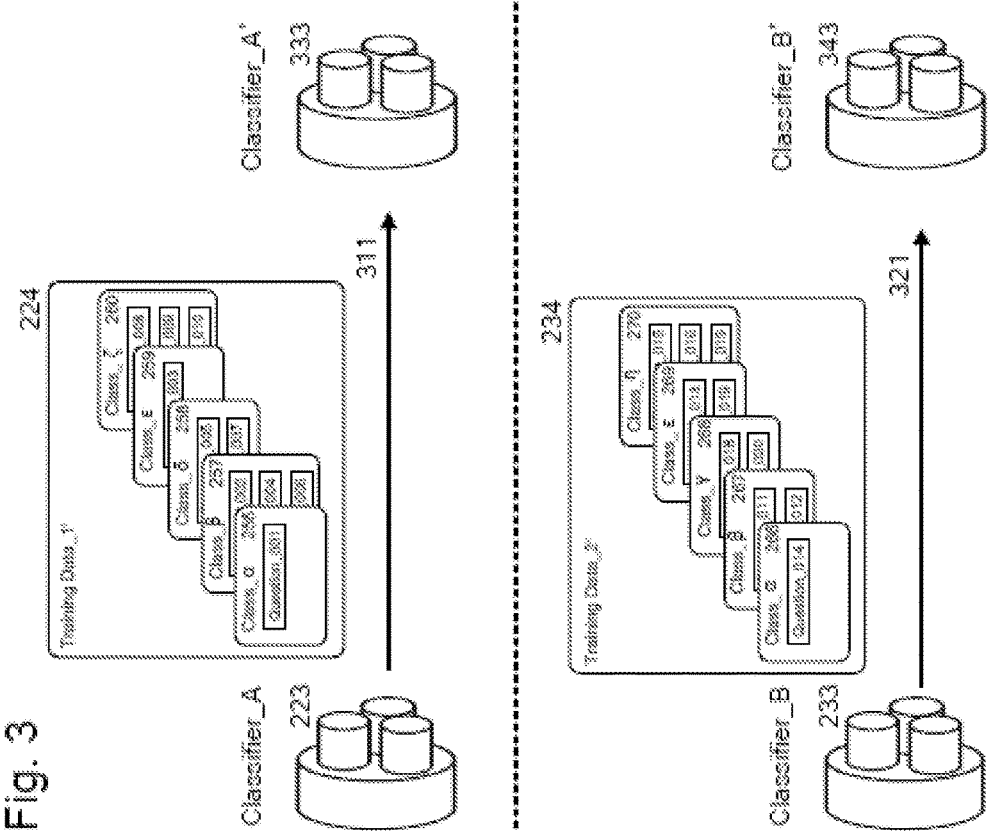
FIG. 3 is a functional block diagram depicting operational steps for updating of a classifier, in accordance with an embodiment of the present invention.

FIG. 3 is a functional block diagram depicting operational steps for updating of a classifier, in accordance with an embodiment of the present invention. With reference to FIG. 3, the first classifier and the second classifier may be, for example, updated based on the updated first and second training data.

At step 311, system (101) may update Classifier_A (223) using Training Data_1' (224) to generate an updated Classifier_A' (333). Similarly, at step 321, system (101) may update Classifier_B' (343) using Training Data_2' (234) to generate an updated Classifier_B' (343).

Figure 4:
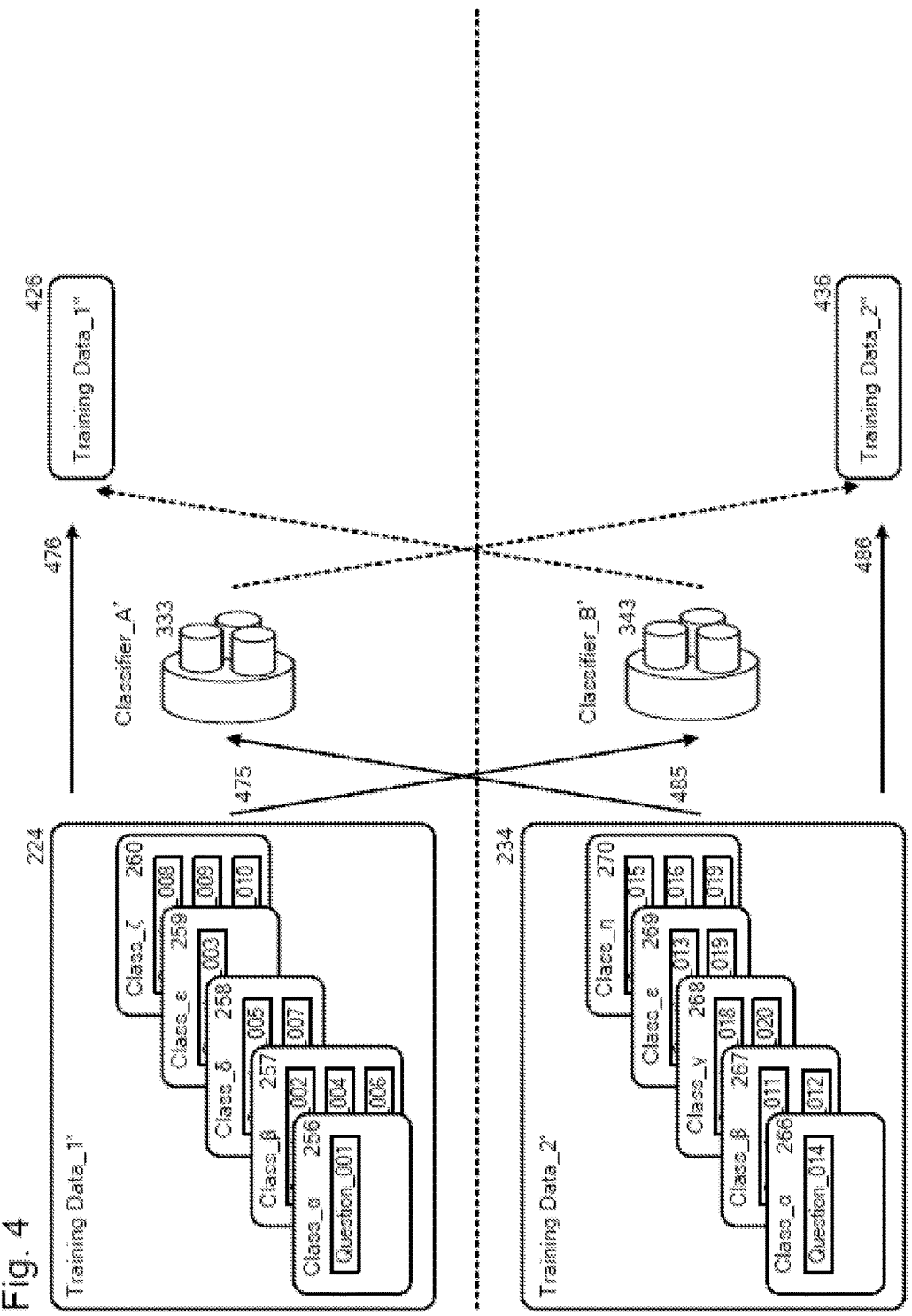
FIG. 4 is a functional block diagram depicting operational steps for iteratively updating training data, in accordance with an embodiment of the present invention.

FIG. 4 is a functional block diagram depicting operational steps for iteratively updating training data, in accordance with an embodiment of the present invention.

In an embodiment of the present invention, iterative or repeated updating of the training data may be affected where a degree of matching between classified questions of the first training data such as Training Data_1' (224) by the first classifier such as Classifier_A (223), is equal to or larger than a predetermined threshold with respect to classified questions of the first training data by the second classifier such as Classifier_B (233). A degree of matching may be determined, for example, based on comparison between one or more questions in Class_$\alpha$ (251) with respect to those of Class_$\alpha$ (256). As described with reference to FIG. 2D, Question_002 can be reclassified from Class_$\alpha$ (251) to Class_$\beta$ (257). Accordingly, Class_$\alpha$ (251) included Question_001 and Question_002 before the reclassification, and only Question_001 after the reclassification. As such, a degree of matching between questions in Class_$\alpha$ (251) before the reclassification, with respect to questions in Class_$\alpha$ (256) after the reclassification, may be determined to be 50%.

With continued reference to FIG. 4, at step 475, system (101) may classify each of Question_001 to Question_010 (212) in Training Data_1' (224) by way of Classifier_B' (343). At step 476, system (101) may update Training Data_1' (224) using the classification results obtained by way of Classifier_B' (343), to generate Training Data_1" (426). Training Data_1" (426) may be an updated version of Training Data_1' (224).

In an embodiment of the present invention, iterative updating of the training data may also be affected where a degree of matching between classified questions of the second training data such as Training Data_2' (234) by the second classifier such as Classifier_B (233), is equal to or larger than a predetermined threshold with respect to classified questions of the second training data by the first classifier such as Classifier_A (223). A degree of matching may be determined, for example, based on comparison between one or more questions in Class_α (261) with respect to those of Class_α (266). As described with reference to FIG. 2D, Question_011 can be reclassified from Class_α (261) to Class_β (267). Accordingly, Class_α (251) included Question_011 and Question_014 before the reclassification, and only Question_014 after the reclassification. As such, a degree of matching between questions in Class_α (261) before the reclassification, with respect to questions in Class_α (266) after the reclassification, may be determined to be 50%.

With continued reference to FIG. 4, at step 485, system (101) may classify each of Question_011 to Question_020 (213) in Training Data_2' (234) by way of Classifier_A' (333). At step 486, system (101) may update Training Data_2' (234) using the classification results obtained by way of Classifier_A' (333), to generate Training Data_2" (436). Training Data_2" (436) may be an updated version of Training Data_2' (234).

Figure 5:
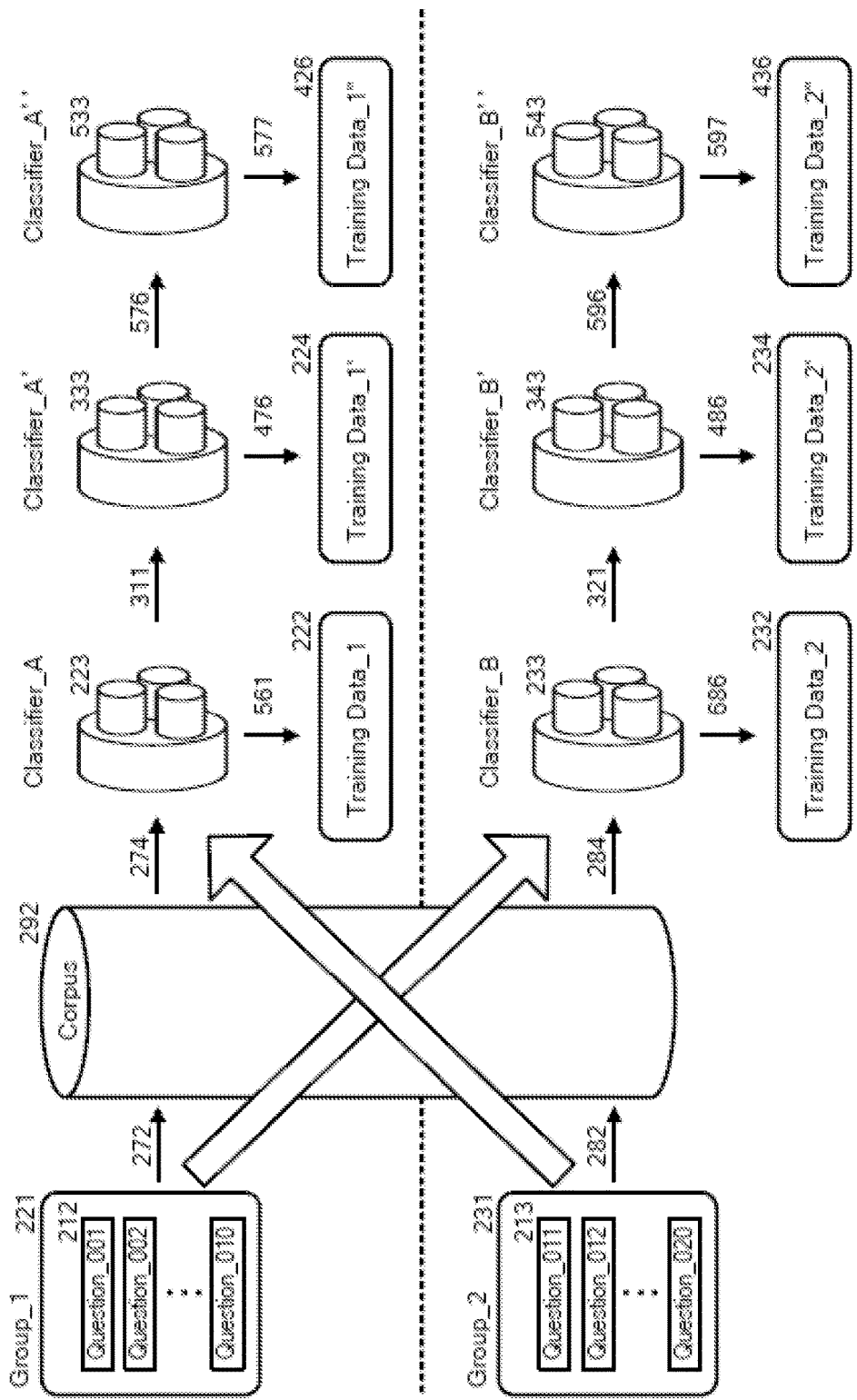
FIG. 5 is a functional block diagram depicting operational steps for iteratively updating training data and iteratively updating classifiers, in accordance with an embodiment of the present invention.

FIG. 5 is a functional block diagram depicting operational steps for iteratively updating training data and iteratively updating classifiers, in accordance with an embodiment of the present invention. As depicted in FIG. 5, iterative updates 561, 476 and 577 to the first training data, and iterative updates 686, 486 and 597 to the second training data, may be applied, respectively. Further, iterative updates 274, 311 and 576, to the first classifier, and iterative 284, 321, 596 updates to the second classifier may be applied, respectively.

In an embodiment of the present invention, iterative updates to the training data may be applied until a degree of matching between questions in a class before a reclassification, with respect to questions in a corresponding class after the reclassification, becomes equal to or larger than a predetermined threshold. In the embodiment, iterative updates to the classifiers may be applied in a similar manner.

In another embodiment of the present invention, the iterative updates to the training may be applied until consecutive degrees of matching between questions in a class before a reclassification, with respect to questions in a corresponding class after the reclassification, becomes lower than a predetermined threshold. In the embodiment, corresponding updated classifiers may be used. In the embodiment, iterative updates to the classifiers may be applied in a similar manner.

In yet another embodiment of the present invention, the iterative updates to the training may be applied until consecutive moving average values of a present or current degree of matching between questions in a class before a reclassification, with respect to questions in a corresponding class after the reclassification, becomes equal to or larger than that of an immediately preceding degree of matching, beyond or below a predetermined threshold. In the embodiment, corresponding updated classifiers may be used. In the embodiment, iterative updates to the classifiers may be applied in a similar manner.

Figure 6B:
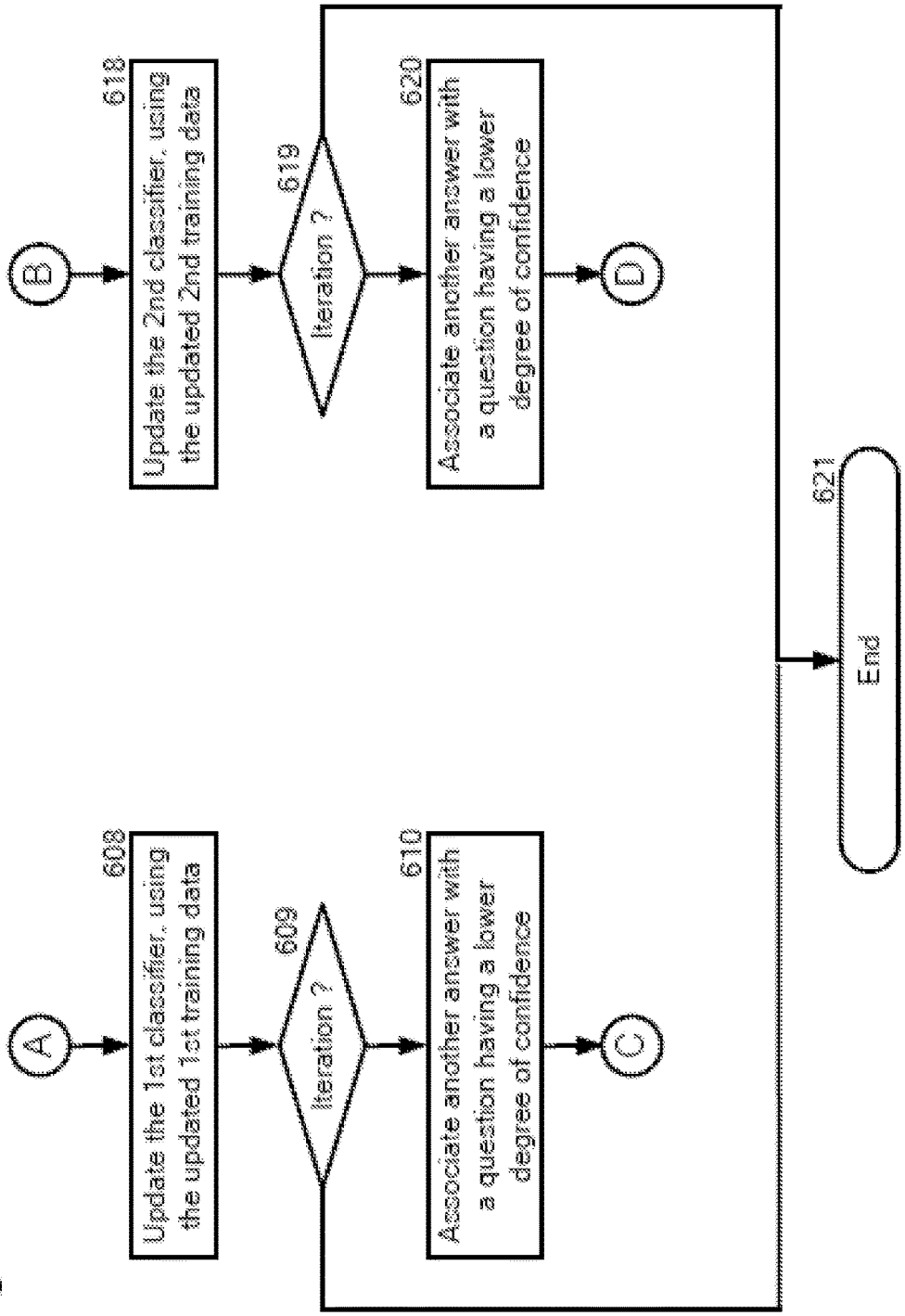

FIG. 6A and FIG. 6B are flowcharts depicting a process for updating training data, in accordance with an embodiment of the present invention. A system, such as system (101), may perform each of the steps, as described with reference to each of FIGS. 6A and 6B. The system may be implemented by way of a single computer, or by way of a number of computers.

With reference to FIG. 6A, at step 601, the system may start the process for updating the training data.

At step 602, the system may divide plural questions into a first group and a second group. In another embodiment of the present invention, a subject matter expert in a target business area may manually divide plural questions into a first group and a second group. In yet another embodiment of the present invention, the system may first divide plural questions into a first preliminary group and a second preliminary group, and a subject matter expert in a target business area may subsequently adjust the preliminary groups manually to generate a first group and a second group.

At step 603, the system may associate an answer of a group of candidate answers with a question of the questions in the first group. In another embodiment of the present invention, a subject matter expert in a target business area may manually associate an answer of a group of candidate answers with a question of the questions in the first group. In yet another embodiment of the present invention, the system may first associate an answer of a group of candidate answers with a question of the questions in the first group, and a subject matter expert in a target business area may subsequently adjust the associations, as necessary.

At step 604, the system may determine a class to which each of the questions in the first group belongs, based on answers associated with each of the questions, to associate a corresponding class label to each of the questions, and to classify each of the questions, accordingly. The system may then generate a first training dataset, accordingly.

At step 605, the system may generate a first classifier based on the first training dataset.

At step 606, the system may reclassify each of the questions in the first training data by way of a second classifier, as generated and described with reference to step 615, below. At step 607, the system may update the first training data based on the reclassification results generated by way of the second classifier, to generate updated first training data. At step 608, the system may update the first classifier using the updated first training data.

At step 609, the system may determine whether to repeat one of steps 606, 607, and 608, in relation to the classification, the update of training data, and the update of classifiers, respectively. In an embodiment of the present invention, the classification, the update of the training data, or the update of classifiers, may be applied until a degree of matching becomes equal to or larger than a predetermined threshold, as previously described.

In an embodiment of the present invention, a degree of matching may be determined (q, using, for example, Equations (I) to (IV). A function, $\phi(q,c)$, can be represented by way of Equation (I):

$$\phi(q, c) = \delta(q \in c) = \begin{cases} 1 & (q \in c) \\ 0 & (q \notin c) \end{cases} \qquad \text{Equation (I)}$$

where q denotes a question and c denotes a class. The function returns one when the question, q, belongs to the class, c, and returns zero in all other cases.

In the embodiment, a degree of matching between the question, q, which was classified into a class $C_j$, using a first classifier, A, and the result of reclassifying the question, q, using a second classifier, B, can be represented by way of Equations (II) and (III), respectively:

$$\phi_{A,B}(c_j) = \sum_i \phi_A(q_i, c_j)\phi_B(q_i, c_j) \qquad \text{Equation (II)}$$

-continued $$\overline{\phi_{A,B}(c_j)} = \phi_{A,B}(c_j) / \sum_i \phi_A(q_i, c_j) \quad \text{Equation (III)}$$

where $\phi_A(q,c)$ denotes a function in which a first classifier, A, is used; $\phi_B(q,c)$ denotes a function in which a second classifier, B, is used; i denotes an identifier associated with a question; and j denotes an identifier associated with of a class.

A determination as to continue iteration may be determined by computing values, according to Equations (I) to (III), for each class, and making a determination as to whether each of the values become equal to or larger than a predetermined threshold, as previously described. The predetermined threshold may be defined, for example, by a subject matter expert in a target business area. The predetermined threshold may be set to, for example, 0.8, as shown in Equation (IV):

$$\sum_j \overline{\phi_{A,B}(c_j)} / \sum_j \geq 0.8 \quad \text{Equation (IV)}$$

In another embodiment of the present invention, updating of the training data and updating of the classifiers may continue until a difference between a present and immediately degree of matching between questions in a class before and after a reclassification by one of the updated classifiers becomes lower than a predetermined threshold. The predetermined threshold, with respect to the difference, may be calculated, for example, by way of Equation (V):

$$\dot{\phi}^n_{A,B}(c_j) = \left| \frac{\phi^n_{A,B}(c_j) - \phi^{n-1}_{A,B}(c_j)}{\phi^n_{A,B}(c_j)} \right| \quad \text{Equation (V)}$$

where n denotes the present iteration; and n-1 denotes the iteration of just before the present iteration. The predetermined threshold may be defined, for example, by a subject matter expert in a target business area.

In yet another embodiment of the present invention, updating of the training data and updating of the classifiers may continue until a judgement or determination is made as to a moving average value of a present and subsequent degree of matching, with respect to questions in a class before and after a reclassification by one of the updated classifiers, becomes equal to or larger than a predetermined threshold. The moving average value may be calculated, for example, by way of Equations (VI) and (VII), respectively:

$$\tilde{\phi}^n_{A,B}(c_j) = \sum_{n'=n-k}^{n} w_{n'} \phi^{n'}_{A,B}(c_j) \quad \text{Equation (VI)}$$

$$\sum_{n'=n-k}^{n} w_{n'} = 1 \quad \text{Equation (VII)}$$

where k denotes k preceding or past updates with respect to a present iteration. The predetermined threshold may be defined, for example, by a subject matter expert in a target business area. Where the judgment or determination is positive or true, the system proceeds to step 610 and then proceeds to step 606.

At step 610, the system may associate another answer of the group of candidate answers with a question of the questions in the first group having a lower degree of confidence. The system subsequently proceeds to step 606, in order to repeat steps 606, 607, 608 and 609.

Similar to that of step 603, at step 613, the system may associate an answer of the group of candidate answers with a question of the questions in the second group. A subject matter expert in a target business area may manually associate an answer of a group of candidate answers with a question of the questions in the first group. The system may otherwise first associate an answer of a group of candidate answers with a question of the questions in the second group, and a subject matter expert in a target business area may subsequently adjust the associations, as necessary.

Similar to that of step 604, at step 614, the system may determine a class to which each of the questions in the second group belongs, based on answers associated with each of the questions, to associate a corresponding class label to each of the questions, and to classify each of the questions, accordingly. The system may then generate a second training dataset, accordingly.

Similar to that of step 605, at step 615, the system may generate a second classifier based on the second training dataset.

Similar to that of step 606, at step 616, the system may reclassify each of the questions in the second training data by way of the first classifier, as generated and described with reference to step 605, above. Similar to that of step 607, at step 617, the system may update the second training data based on the reclassification results generated by way of the first classifier, to generate updated second training data. Similar to that of step 608, at step 618, the system may update the second classifier using the updated second training data.

Similar to that of step 609, at step 619, the system may determine whether to repeat one of steps 616, 617, and 618, in relation to the classification, the update of training data, and the update of the second classifiers, respectively. The classification, the update of the second training data, or the update of classifiers, may be applied until a degree of matching becomes equal to or larger than a predetermined threshold, as previously described. The degree of matching may be determined by adapting Equations (I) to (IV), as previously described, to produce Equations (I') to (IV') for application to the second training data and second classifiers, accordingly. As such, Equation (I') may be represented by:

$$\phi(q, c) = \delta(q \in c) = \begin{cases} 1 & (q \in c) \\ 0 & (q \notin c) \end{cases} \quad \text{Equation (I')}$$

where q denotes a question and c denotes a class.

In an embodiment of the present invention, a degree of matching between the question, q, which was classified into a class Cj, using a second classifier, B, and the result of reclassifying the question, q, using the second classifier, B, can be represented by way of Equations (II') and (III'), respectively:

$$\phi_{B,A}(c_j) = \sum_i \phi_B(q_i, c_j) \phi_A(q_i, c_j) \quad \text{Equation (II')}$$

-continued $$\overline{\phi_{B,A}(c_j)} = \phi_{B,A}(c_j) / \sum_i \phi_B(q_i, c_j) \quad \text{Equation (III')}$$

where $\phi_B(q,c)$ denotes a function in which a second classifier, B, is used; $\phi_A(q,c)$ denotes a function in which a first classifier, A, is used; i denotes an identifier associated with questions; and j denotes an identifier associated with a class.

A determination as to continue iteration may be determined by computing values, according to Equations (I'), (II'), and (III'), for each class, and making a determination as to whether each of the values become equal to or larger than a predetermined threshold, as previously described. The predetermined threshold may be defined, for example, by a subject matter expert in a target business area. The predetermined threshold may be set to, for example, 0.8, as shown in Equation (IV'):

$$\sum_j \overline{\phi_{B,A}(c_j)} / \sum_j \geq 0.8 \quad \text{Equation (IV')}$$

In another embodiment of the present invention, updating of the training data and updating of the classifiers may continue until a difference between a present and immediately degree of matching between questions in a class before and after a reclassification by one of the updated classifiers becomes lower than a predetermined threshold. The predetermined threshold, with respect to the difference, may be calculated, for example, by way of Equation (V'):

$$\delta^n_{B,A}(c_j) = \left| \frac{\phi^n_{B,A}(c_j) - \phi^{n-1}_{B,A}(c_j)}{\phi^n_{B,A}(c_j)} \right| \quad \text{Equation (V')}$$

where n denotes the present iteration; and n-1 denotes the iteration of just before the present iteration. The predetermined threshold may be defined, for example, by a subject matter expert in a target business area.

In yet another embodiment of the present invention, updating of the training data and updating of the classifiers may continue until a judgement or determination is made as to a moving average value of a present and subsequent degree of matching, with respect to questions in a class before and after a reclassification by one of the updated classifiers, becomes equal to or larger than a predetermined threshold. The moving average value may be calculated, for example, by way of Equations (VI') and (VII'):

$$\tilde{\phi}^n_{A,B}(c_j) = \sum_{n'=n-k}^n w_{n'} \phi^{n'}_{A,B}(c_j) \quad \text{Equation (VI)}$$

$$\sum_{n'=n-k}^n w_{n'} = 1 \quad \text{Equation (VII)}$$

where k denotes k preceding or past updates with respect to a present iteration. The predetermined threshold may be defined, for example, by a subject matter expert in a target business area. Where the judgment or determination is positive or true, the system proceeds to step 620 and then proceeds to step 616.

At step 610, the system may associate another answer of the group of candidate answers with a question of the questions in the first group having a lower degree of confidence. The system subsequently proceeds to step 606, in order to repeat steps 616, 617, 618 and 619.

With reference to FIG. 6B, at step 621, the system may terminate the process for updating the training data.

According to step 602, the set of questions are divided into two groups, the first group and the second group. The system may subsequently proceed to steps 603 to 610 for the first group, and steps 613 to 620 for the second group. Where a single set of initial training data is used to generate a classifier, an occurrence of overtraining may result, causing the classifier to produce various output errors including, for example, bias errors. Advantageously, embodiments of the present invention prevent the occurrence of overtraining in dividing the set of questions into two mutually exclusive groups, as in steps 606 and 616.

Figure 7:
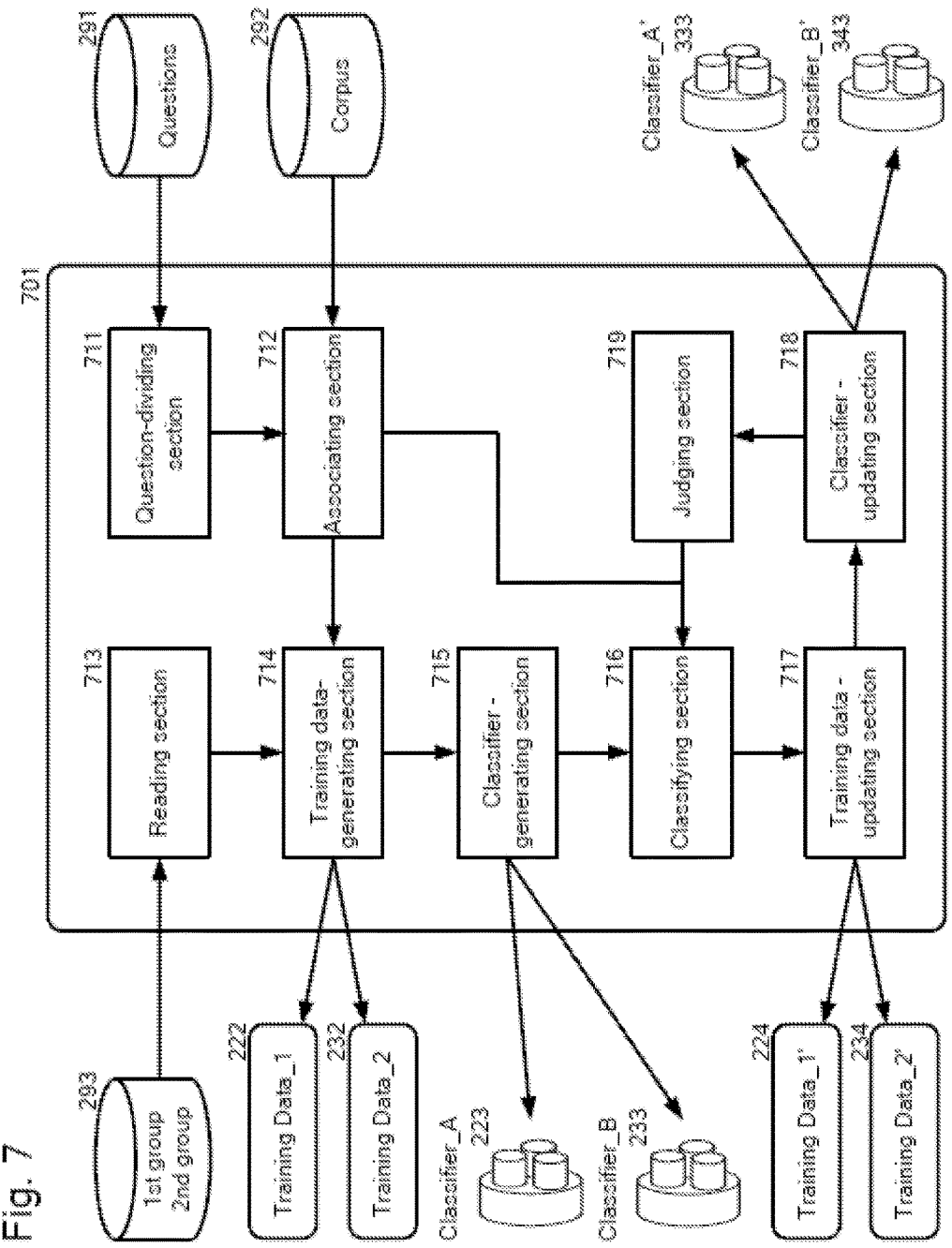
FIG. 7 is an overall functional block diagram depicting system hardware in relation to the process of FIG. 6A and FIG. 6B, in accordance with an embodiment of the present invention.

FIG. 7 is an overall functional block diagram depicting system hardware in relation to the process of FIG. 6A and FIG. 6B, in accordance with an embodiment of the present invention. System (701) corresponds to system (101), as described with reference to FIG. 1. System (701) may comprise question-dividing section (711), associating section (712), training data-generating section (714), classifier-generating section (715), classifying section (716) and training data-updating section (717). System (701) may comprise reading section (713) in lieu of question-dividing section (711) and associating section (712). System (701) may further comprise classifier-updating section (718) and judging section (719).

Question-dividing section (711) reads plural questions from the storage (291) and subsequently divides plural questions into a first group and a second group. Question-dividing section (711) may perform step 602, as previously described.

Associating section (712) associates an answer of a group of candidate answers with each question of the questions in the first group and the second group. The answer may have a highest relative degree of confidence with respect to other answers of the group of candidate answers. Associating section (712) may perform steps 603 and 613, as previously described.

Reading section (713) reads each of a first group and a second group into a memory, each of the first group and the second group having plural questions and each of the questions being associated with an answer, instead of dividing the plural questions into the first group and the second group and associating an answer. Reading section (713) enables reading the training data into memory, the training data comprising a first and second group of questions, wherein each question is associated with an answer.

Training data-generating section (714) determines, using the answer associated with each of the questions in the first group, a class to which each of the questions belongs, and subsequently generates Training Data$_{-1}$ (222) as first training data, as previously described. The questions in Training Data$_{-1}$ (222) are classified into decided classes. Each of the decided classes is associated with the one or more questions. The determination as to a class to which each of the questions in the first group belongs is made by identifying a class having a degree of confidence higher than a predetermined threshold, and where the class is not identified, an identifier associated with the answer is attached, as a class label, to the class to which the question belongs. Training data-generating section (714) further determines using the answer associated with each of the questions in the second group, a class to which each of the questions belongs, and subsequently generates Training Data$_2$ (232) as second training data, as previously described. The questions in the second training data (232) are then classified and associated, and the determination as to a class to which each of the questions in the second group belongs is made in a manner similar to that of the first group. Training data-generating section (714) may perform steps 604 and 614, as previously described. Training data-generating section (714) enables determining a class of answers comprising the answer to a question for each question of the first and second groups of questions, the class of answers having a class label being associated with each of the questions, and each of the questions being classified into a respective class of answers.

Classifier-generating section (715) generates Classifier_A (223) as a first classifier, based on the first training data (222). Classifier-generating section (715) further generates Classifier_B (233) as a second classifier, based on the second training data (232). Classifier-generating section (715) may perform steps 605 and 615, as previously described. Classifier-generating section (715) enables generating first and second training data comprising the first and second groups of questions and corresponding classes of answers for use in first and second classifiers, respectively.

Classifying section (716) classifies, using the second classifier (233), each of the questions in the first training data. Classifying section (716) further classifies, using the first classifier (223), each of the questions in the second training data. Classifying section (716) may perform steps 606 and 616, as previously described. Classifying section (716) enables classifying by the second classifier each question of the first group of questions, and classifying by the first classifier each question of the second group of questions, each question being classified into a corresponding class of answers, wherein the classifying by the first and second classifiers each generate respective classification results.

Training data-updating section (717) updates the first training data (222) using the classification results obtained by way of the second classifier (233), and subsequently generates Training Data_1' (224) as the updated first training data. Updates to the first training data (222) may be applied when a degree of confidence of a class which was returned by the second classifier (233) is equal to or larger than a predetermined threshold, as previously described. Training data-updating section (717) further updates the second training data (232) in a similar manner, using the classification results obtained by way of the first classifier (223), and subsequently generates Training Data_2' (234) as the updated second training data. Updates to the second training data (232) may be applied when a degree of confidence of a class which was returned by the first classifier (223) is equal to or larger than a predetermined threshold, as previously described. Training data-updating section (717) may perform steps 607 and 617, as previously described. Training data-updating section (717) enables updating one or more of the first and second training data based on the classification results, and generating updated first and second training data for use in the first and second classifiers, respectively.

Classifier-updating section (718) updates the first classifier (223) using the updated first training data (224), and subsequently generates Classifier _A' (333) as the updated first classifier. Classifier-updating section (718) further updates the second classifier (233) using the updated second training data (234), and subsequently generates Classifier _B' (343) as the updated second classifier. Classifier-updating section (718) may perform steps 608 and 618, as previously described. Classifier-updating section (718) enables updating one of the first and second classifiers based on the updated first and second training data, respectively.

Judging section (719) judges or determines whether or not a degree of matching, between the one or more questions associated with the class to which a question belongs before being classified using each of the updated classifiers (333, 343), and the one or more questions associated with a class after the classification or reclassification, becomes equal or larger than a predetermined threshold. Judging section (719) otherwise judges or determines whether or not a difference between the present degree of matching, between the one or more questions associated with the class to which a question belongs before being classified using each of the updated classifiers (333, 343), and the one or more questions associated with the class after the classification and the immediately preceding degree of matching, becomes lower than a predetermined threshold. Judging section (719) otherwise judges or determines whether or not a moving average value of the present degree of matching between the one or more questions associated with the class to which a question belongs before being classified using each of the updated classifiers (333, 343), and the one or more questions associated with the class after the classification becomes equal or larger than a predetermined threshold. Judging section (719) may perform steps 609 and 619, as previously described.

In a step of the iteration process, associating section (712) associates another answer of the group of candidate answers with a question having a lower degree of confidence, where a degree of confidence obtained by classifying, using the second classifier, each of the questions in Training Data_1 (222) as the first training data is lower than a predetermined threshold. This another answer may be an answer having the next highest degree of confidence among answers. Associating section (712) further associates another answer of the group of candidate answers with a question having a lower degree of confidence, where a degree of confidence obtained by classifying, using the first classifier, each of the questions in Training Data_2 (232) as the second training data is lower than a predetermined threshold. This another answer is an answer having the next highest degree of confidence among answers.

Figure 8A:
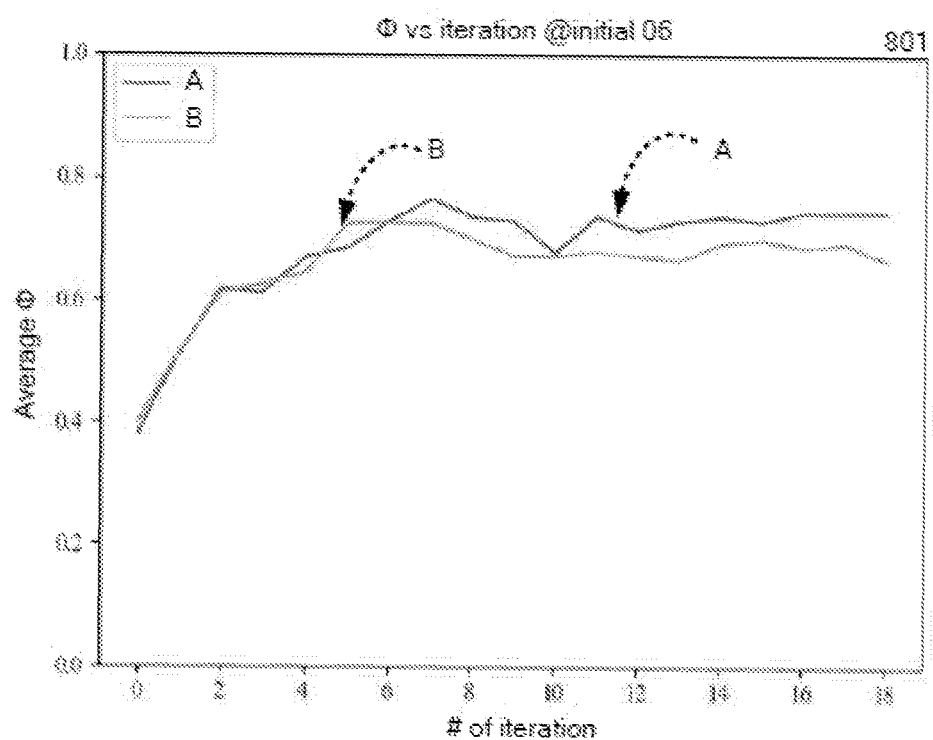
FIG. 8A and FIG. 8B depict aspects of a working example of updating training data, in accordance with an embodiment of the present invention.
Figure 8A:
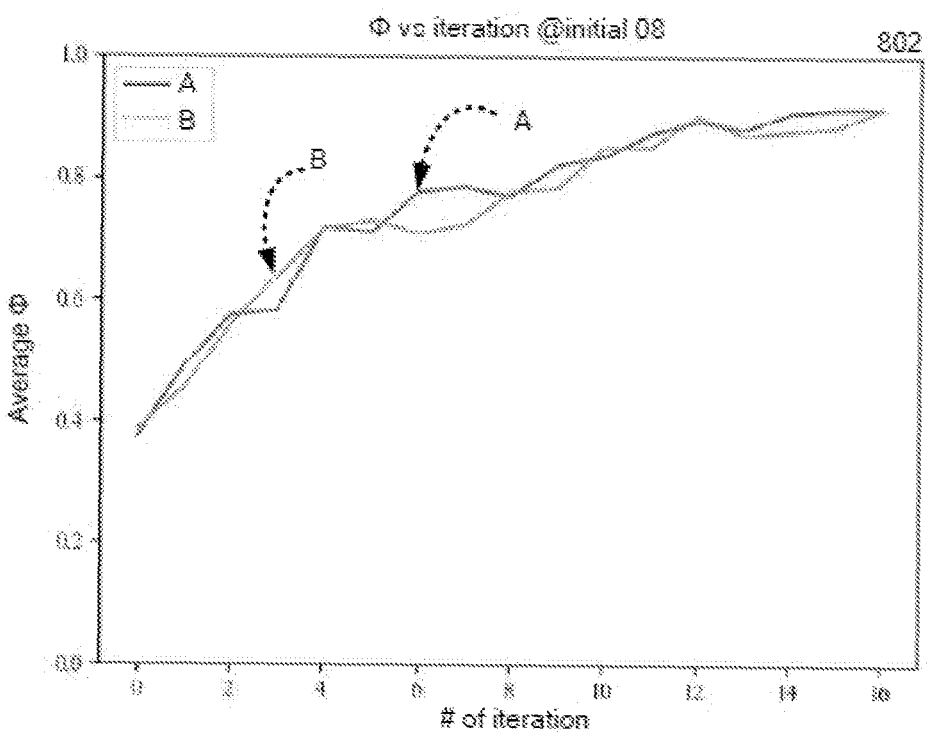
Figure 8B:
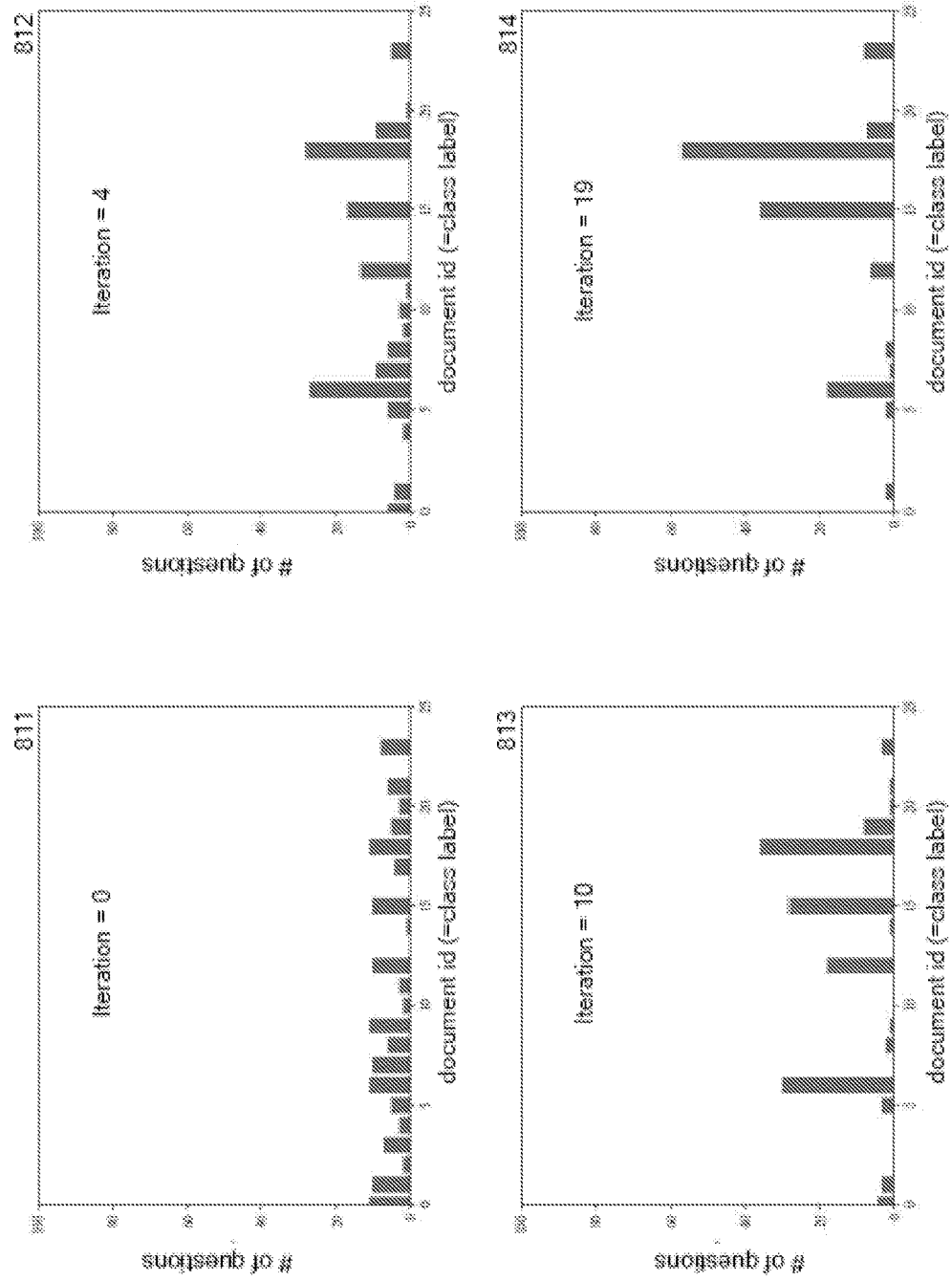

FIG. 8A and FIG. 8B depict aspects of a working example of updating training data, in accordance with an embodiment of the present invention. A comparison of the convergence status between the threshold values, 0.6 and 0.8, of the degree of confidence for the classifier, is depicted.

In an example, the search engine used may be the IBM® Bluemix Retrieve & Rank (R&R). In the example, the classifier used may be the IBM® Bluemix Natural Language Classifier (NLC). In the example, the set of questions used may be included as part of training data, such as provided on the tutorial of IBM® Bluemix Natural Language Classifier (NLC). In the example, the set of candidate answers used may be answers of question-answer pairs, such as may be preprepared in a FAQ.

The process can include the Following Steps:

In the repeat classification process, classification results of the questions with values of the degree of confidence of classification larger than a threshold value of the degree of confidence for the classifier were adopted. For each of the questions with values of the degree of confidence less than or equal to the threshold value, the question was again processed by the search engine and the second-positioned result was adopted.

The convergence status of training data was measured by examining the ratio of agreement after repeat classification for each of the groups.

The convergence status was measured with the threshold value of the degree of confidence for the classifier being varied to 0.6 and 0.8.

With reference to FIG. 8A, Graph (801) shows the results in a case where the threshold value of the degree of confidence for the classifier=0.6. Graph (801) shows that no increase in the ratio of the degree of matching was observed after the sixth iterations. Graph (802) shows the results in a case where the threshold value of the degree of confidence for the classifier=0.8. Graph (802) shows that an increase in the ratio of the degree of matching was observed at every iteration.

With reference to FIG. 8B, a distribution of training data obtained by the working example described in FIG. 8A, where the threshold value of the degree of confidence for the classifier is 0.6, is depicted. As depicted in FIG. 8B, clustering of the questions to the classes can be achieved. However, there is a tendency of questions to be largely localized to document ID (corresponding to a class label) associated with each of the specific answers. The answers corresponding to the document IDs 6, 12 and 18 are likely to be found by the search processing so that those answers were found as a second-positioned search result for many questions. If the degree of confidence of the result of classification by the classifier is low, the question is processed by the search engine. As seen in the graphs (811, 812, 813 and 814), questions resulting many times in a low confidence value were finally gathered into the classes associated with the document IDs 6, 12 and 18.

Figure 9A:
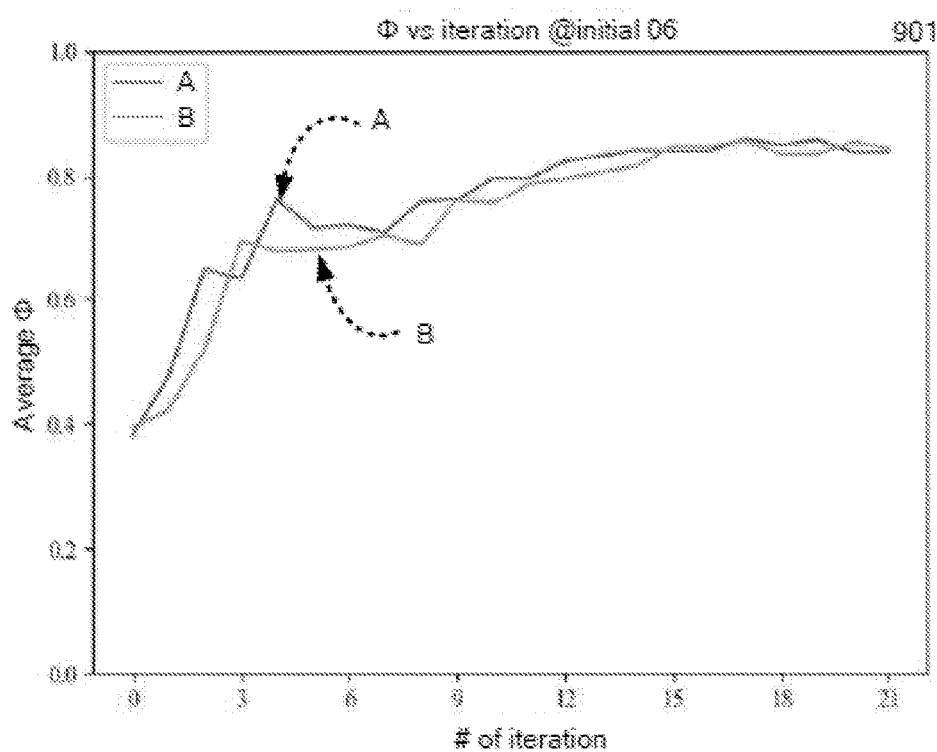
FIG. 9A and FIG. 9B depict aspects of a working example of updating training data, in accordance with an embodiment of the present invention.
Figure 9A:
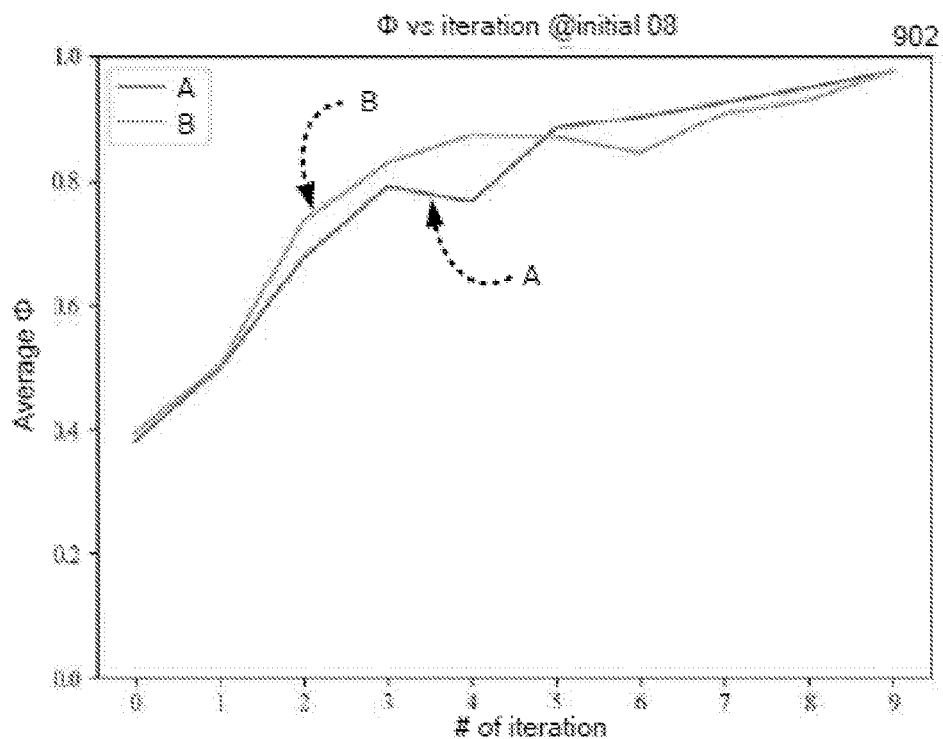
Figure 9B:
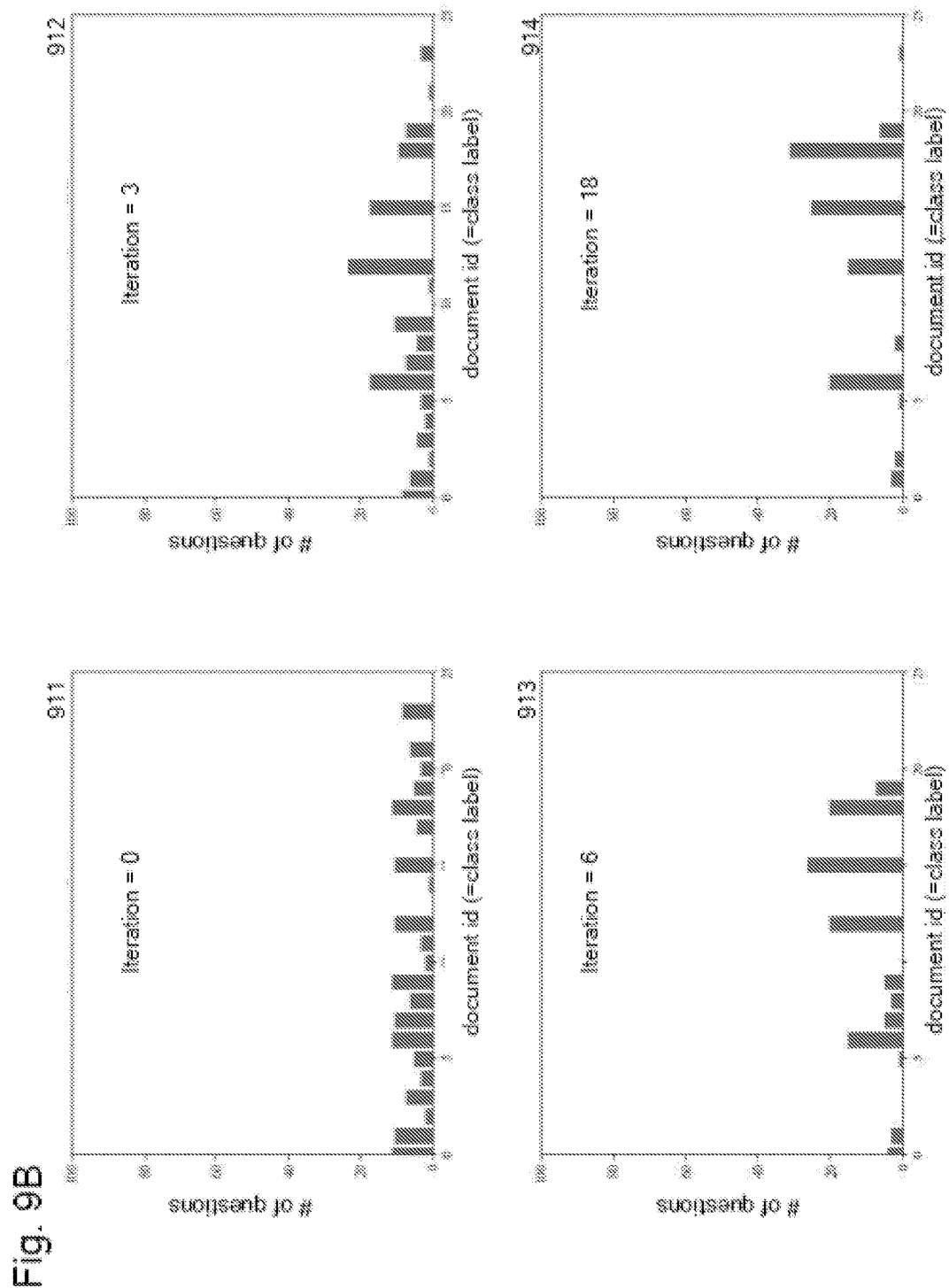

FIG. 9A and FIG. 9B depict aspects of a working example of updating training data, in accordance with an embodiment of the present invention. The process used in FIG. 9A and FIG. 9B, with respect to that of FIG. 8A and FIG. 8B, included the following modifications:

In the repeat classification of a question of one group, if the question is not classified by the classifier of the other group into the class to which the question belongs in the one group and the degree of confidence is less than or equal to a threshold value two or more times, the question is excluded and moves from the present class to "other class" or outside of the class having an identifier common with the identifier associated with the answer.

It is supposed that a question which is not classified into any class can be extracted by an addition of the other class to the classifier.

With reference to FIG. 9A, Graph (901) shows the results in a case where the threshold value of the degree of confidence for the classifier=0.6. Graph (901) shows that no significant difference in the ratio of the degree of matching was observed before and after the iteration. Graph (902) shows the results in a case where the threshold value of the degree of confidence for the classifier=0.8. The graph (902) shows that the iteration process of training data converges fast. The ratio of the degree of matching exceeded 95% at the ninth iterations.

With reference to FIG. 9B, a distribution of training data obtained by the another working example described in FIG. 9A, where the threshold value of the degree of confidence for the classifier is 0.6, is depicted. As depicted in FIG. 9B, each of graphs 911, 912, 913, and 914, indicate that the localization was significantly avoided.

According to the obtained results, as described by the examples in FIGS. 8A, 8B, 9A and 9B, the following was confirmed:

Complementary utilization of the search engine (degree of the matching between a question and an answer) and a classifier (degree of the matching between questions) may enable automatic clustering of questions.

There may be tendencies that the degree of matching can become better by repeating the iteration and that the degree of matching can ultimately converge to a constant value. On the other hand, it has been found that the clustering result of questions depends on the accuracy of the search processing carried out in creating the initial clusters.

According to the results obtained by the examples described in FIGS. 8A, 8B, 9A and 9B, the following schemes are effective in implementing the embodiment of the present method:

When the classification confidence value is low and search processing is carried out again, there are many degrees of freedom in how the result of the search processing is utilized.

In the repeat classification process, questions which are not classified into the classes of their own two times or more and the degree of confidence of classification are less than or equal to a threshold value are moved into "other class", thereby to improve the classification results.

Advantageously, the repeat classification process according to the present disclosure may be applied to efficiently reduce interpretation error in natural language understanding models during use, by enabling targeted improvements in precision of training data used to train the natural language understanding models. For example, the repeat classification process may be systematically applied by subject matter experts to ease the task of assembling semantically accurate training data, as a result of the automatic clustering of questions (and answers) effect provided by embodiments of the present invention. Further, the repeat classification process according to the present disclosure enables the models to better leverage training data used in training. To that end, embodiments of the present invention have the capacity to improve the technical field of cognitive computing, and more particularly, natural language processing, by addressing the natural language processing centric issue of precisely and accurately training natural language understanding models efficiently and effectively using training data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
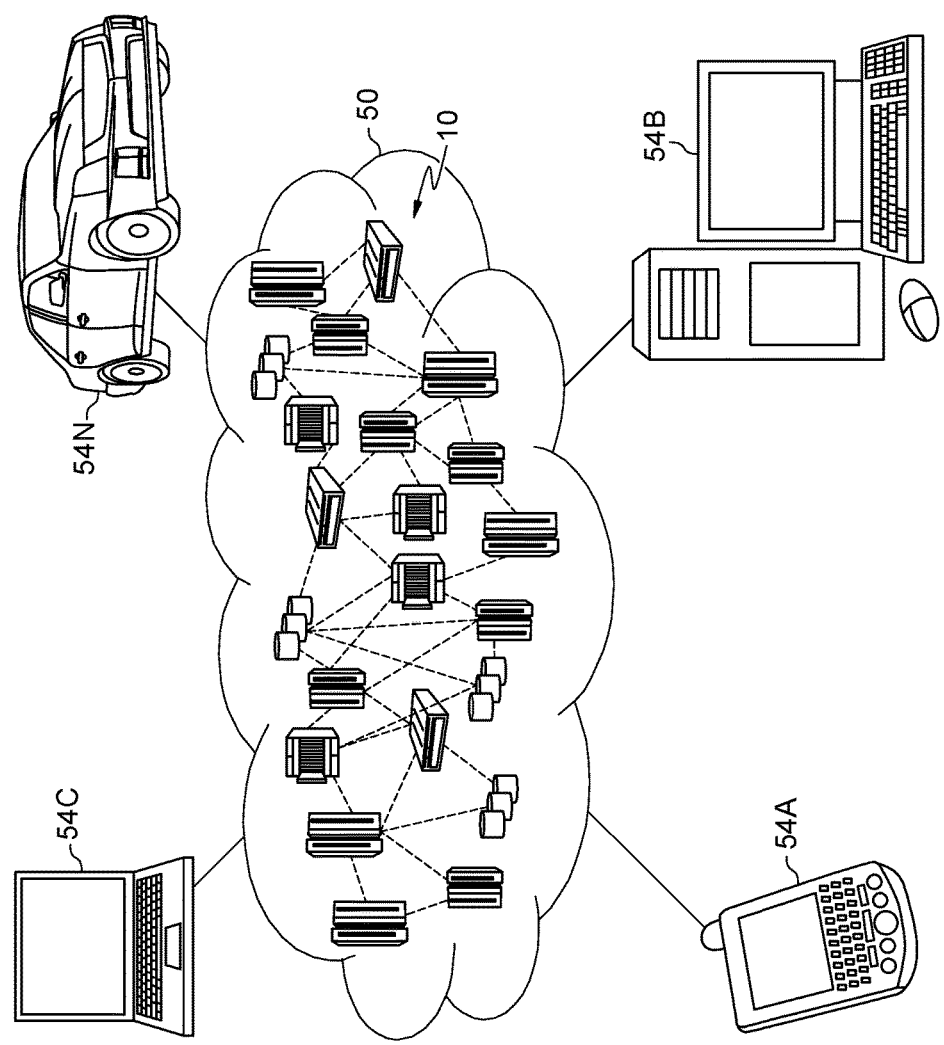
FIG. 10 depicts a cloud computing environment, in accordance with an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
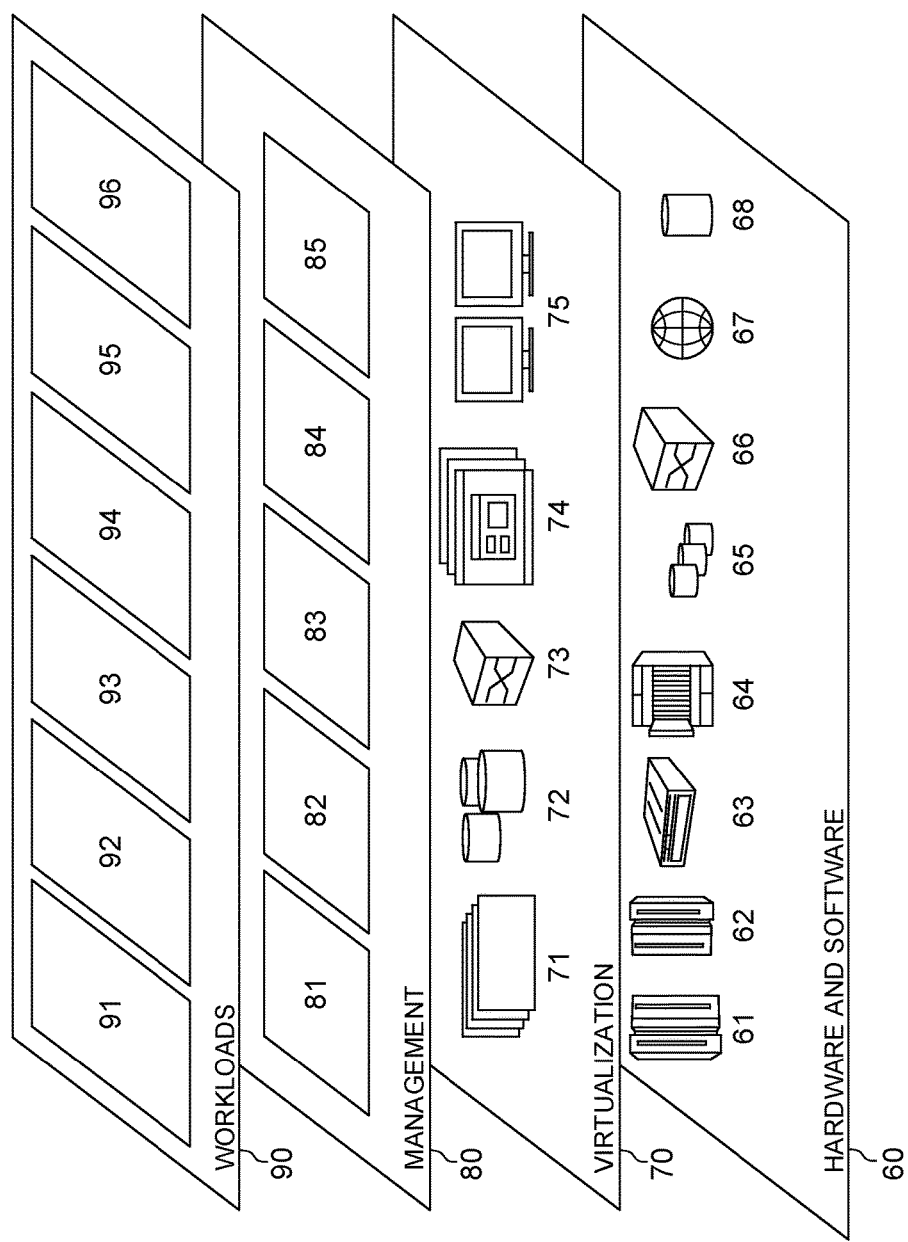
FIG. 11 depicts abstraction model layers, in accordance with an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In certain embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and updating training data 96.

What is claimed is:

1. A computer-implemented method for updating classifiers, the method comprising:
    reading data including a plurality of questions into memory, the data including a first and a second group of questions;
    generating first and second training data by:
        identifying an answer for each question of the first and second groups of questions, each of the answers having a class label, and
        associating each question of the first and second groups of questions with the answer identified for the question and a class corresponding with the class label of the identified answer,
        wherein the first training data includes the first group of questions, and respective associated answers and classes, and the second training data includes the second group of questions, and respective associated answers and classes;
    generating a first classifier based on the first training data and generating a second classifier based on the second training data;
    classifying by the second classifier each question of the first group of questions, and classifying by the first classifier each question of the second group of questions, each question of the first and second groups of questions being classified into a corresponding class of answers, wherein the classifying by the first classifier generates second classification results and the classifying by the second classifier generates first classification results;
    updating the first training data based on the first classification results and updating the second training data based on the second classification results; and
    updating the first classifier using the updated first training data and updating the second classifier using the updated second training data.

2. The computer-implemented method of claim 1, wherein each of:
    the classifying by the second classifier each question of the first group of questions, and the classifying by the first classifier each question of the second group of questions,
    the updating the first training data based on the first classification results and the updating the second training data based on the second classification results, and
    the updating the first classifier using the updated first training data and the updating the second classifier using the updated second training data are repeated until a degree of matching each question of the first group of questions exceeds a predetermined threshold value, both before a classifying by the first classifier and after a classifying by the second classifier, and a degree of matching each question of the second group of questions exceeds the predetermined threshold value, both before a classifying by the second classifier and after a classifying by the first classifier.

3. The computer-implemented method of claim 1 wherein each of:
    the classifying by the second classifier each question of the first group of questions, and the classifying by the first classifier each question of the second group of questions,
    the updating the first training data based on the first classification results and the updating the second training data based on the second classification results, and
    the updating the first classifier using the updated first training data and the updating the second classifier using the updated second training data are repeated until a difference between consecutive degrees of matching each question of the first group of questions does not exceed a predetermined threshold value, both before a classifying by the first classifier and after a classifying by the second classifier, and a difference between consecutive degrees of matching each question of the second group of questions does not exceed the predetermined threshold value, both before a classifying by the second classifier and after a classifying by the first classifier.

4. The computer-implemented method of claim 1, wherein each of:
    the classifying by the second classifier each question of the first group of questions, and the classifying by the first classifier each question of the second group of questions,
    the updating the first training data based on the first classification results and the updating the second training data based on the second classification results, and
    the updating the first classifier using the updated first training data and the updating the second classifier using the updated second training data are repeated until a moving average value of the degrees of matching each question of the first group of questions exceeds a predetermined threshold value, both before a classifying by the first classifier and after a classifying by the second classifier, and a moving average value of the degrees of matching each question of the second group of questions exceeds the predetermined threshold value, both before a classifying by the second classifier and after a classifying by the first classifier.

5. The computer-implemented method of claim 1, wherein the first and second classification results include degree of confidence values corresponding to the classifying of each question with respect to corresponding classifications by the first and second classifiers, respectively, and wherein updating of the first and second training data occurs when a degree of confidence value exceeds a predetermined threshold value.

6. The computer-implemented method of claim 1, wherein the generating of first and second training data further comprises:
    determining a degree of confidence value for each answer identified for a question of the first and second groups of questions; and
    identifying each answer based on one of: a highest relative degree of confidence value for the answer, and a degree of confidence value for the answer that exceeds a predetermined threshold value.

7. The computer-implemented method of claim 1, wherein the first and second classification results include degree of confidence values corresponding to the classifying of each question with respect to corresponding classifications by the first and second classifiers, respectively, and wherein updating the first and second training data comprises:
    reclassifying a question from one class into another class when a degree of confidence value for the question exceeds a predetermined threshold value.

8. The computer-implemented method of claim 1, the method further comprising:

dividing the data into the first and second group of questions.

9. The computer-implemented method of claim 8, wherein the first and second classification results include degree of confidence values corresponding to the classifying of each question with respect to corresponding classifications by the first and second classifiers, respectively, and wherein the associating each question with an answer is repeated until a lowest relative degree of confidence value that does not exceed a predetermined threshold value occurs.

10. The computer-implemented method of claim 1, wherein the first and second classification results include degree of confidence values corresponding to the classifying of each question with respect to corresponding classifications by the first and second classifiers, respectively, and wherein the associating each question of the first and second groups of questions with the answer identified for the question further comprises:

searching an answer corpus using a search engine.

11. The computer-implemented method of claim 10, wherein each associated answer is of a class of answers having a highest relative degree of confidence value.

12. The computer-implemented method of claim 1, wherein the associating each question of the first and second groups of questions with the answer identified for the question is repeated until a relative degree of confidence value for an answer exceeds a lowest relative degree of confidence value.

13. A computer-implemented method for updating classifiers, the method comprising:

dividing a group of questions into a first and a second group of questions;

associating each question with an answer;

reading the first and second groups of questions into memory, wherein each question is associated with an answer;

determining a class of answers for each question of the first and second groups of questions, the class of answers having a class label being associated with each of the questions, and each of the questions being classified into a respective class of answers;

generating first and second training data comprising the first and second groups of questions and corresponding classes of answers for use in first and second classifiers, respectively;

classifying by the second classifier each question of the first group of questions, and classifying by the first classifier each question of the second group of questions, each question of the first and second groups being classified into a corresponding class of answers, wherein the classifying by the first classifier generates second classification results and the classifying by the second classifier generates first classification results;

updating the first training data based on the first classification results and updating the second training data based on the second classification results; and updating the first classifier using the updated first training data and updating the second classifier using the updated second training data.

* * * * *